(12) United States Patent
Park et al.

(10) Patent No.: US 9,622,076 B2
(45) Date of Patent: Apr. 11, 2017

(54) USER TERMINAL, EXTERNAL APPARATUS, DATA TRANSCEIVING SYSTEM, AND DATA TRANSCEIVING METHOD

(71) Applicant: Samsung Electronics Co., Ltd., Suwon-si, Gyeonggi-do (KR)

(72) Inventors: Sung-jin Park, Seoul (KR); Hyun-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 14/073,407

(22) Filed: Nov. 6, 2013

(65) Prior Publication Data

US 2014/0128031 A1 May 8, 2014

(30) Foreign Application Priority Data

Nov. 7, 2012 (KR) .................. 10-2012-0125556

(51) Int. Cl.
*H04W 24/00* (2009.01)
*H04W 12/06* (2009.01)
*H04L 29/06* (2006.01)
*H04W 4/02* (2009.01)
(Continued)

(52) U.S. Cl.
CPC ............ *H04W 12/06* (2013.01); *H04L 63/18* (2013.01); *H04L 67/18* (2013.01); *H04L 67/306* (2013.01); *H04M 1/7253* (2013.01); *H04W 4/023* (2013.01); *H04W 4/027* (2013.01)

(58) Field of Classification Search
CPC .......... H04W 4/02; H04W 4/08; H04W 4/12; H04W 4/025; H04W 4/206; H04W 4/021; H04W 4/06; H04W 4/10; H04W 76/005; H04W 4/043; H04W 8/186; H04L 67/22; H04L 51/32; H04L 63/065; G06F 17/30241
USPC ... 455/456.1, 456.3, 457, 456.6, 466, 414.1, 455/412.2, 41.2, 456.5, 404.2, 412.1, 418, 455/420; 709/203, 207, 224; 340/991, 340/993, 686.6
See application file for complete search history.

(56) References Cited

U.S. PATENT DOCUMENTS 7,984,295 B2 7/2011 Oh et al.
8,224,351 B1 * 7/2012 Sushkov .................. G01S 5/02
340/539.13
(Continued)

FOREIGN PATENT DOCUMENTS

CN 101009552 A 8/2007
CN 102546801 A 7/2012
(Continued)

*Primary Examiner* — Fred Casca
(74) *Attorney, Agent, or Firm* — Jefferson IP Law, LLP

(57) ABSTRACT

A user terminal is provided. The user terminal includes a communicator configured to communicate with an external apparatus, a sound detector configured to detect a sound around the user terminal during a period of time, a location detector configured to detect a location of the user terminal during the period of time, and a controller configured to transmit information regarding the detected sound and the detected location to the external apparatus, and transmit data relevant to a user group determined based on the information regarding the detected sound and the detected location to the external apparatus or receive the data from the external apparatus.

13 Claims, 24 Drawing Sheets

(51) Int. Cl.
*H04L 29/08* (2006.01)
*H04M 1/725* (2006.01)

(56) References Cited

U.S. PATENT DOCUMENTS

| | | | |
|---|---|---|---|
| 2005/0264159 A1* | 12/2005 | Foo | F21V 9/16 313/483 |
| 2007/0150720 A1* | 6/2007 | Oh | H04L 63/065 713/153 |
| 2007/0207727 A1* | 9/2007 | Song | H04H 20/93 455/3.06 |
| 2011/0028160 A1 | 2/2011 | Roeding et al. | |
| 2012/0021768 A1 | 1/2012 | Rudland et al. | |
| 2012/0083286 A1* | 4/2012 | Kim | G06Q 30/0261 455/456.1 |

FOREIGN PATENT DOCUMENTS

| | | |
|---|---|---|
| CN | 102710858 A | 10/2012 |
| EP | 2 278 780 A1 | 1/2011 |
| EP | 2 495 936 A1 | 9/2012 |
| JP | 2008271465 A | 11/2008 |
| JP | 2009043057 A | 2/2009 |
| WO | 2010/087797 A1 | 8/2010 |
| WO | 2013-039306 A1 | 3/2013 |

\* cited by examiner

USER TERMINAL, EXTERNAL APPARATUS, DATA TRANSCEIVING SYSTEM, AND DATA TRANSCEIVING METHOD

CROSS-REFERENCE TO RELATED APPLICATIONS(S)

This application claims the benefit under 35 U.S.C. §119(a) of a Korean patent application filed on Nov. 7, 2012 in the Korean Intellectual Property Office and assigned Serial No. 10-2012-0125556, the entire disclosure of which is hereby incorporated by reference.

TECHNICAL FIELD

Apparatuses and methods consistent with the present disclosure relate to a user terminal. More particularly, the present disclosure relates to a user terminal which transceives data by detecting a sound, an external apparatus, a data transceiving system, and a data transceiving method.

BACKGROUND

As diverse types of mobile devices have been developed, technology for transferring data between mobile devices also has been developed. Basically, the mobile devices exchange data using wireless communication technology, and thereby are generally weak in stability, security, and efficiency of data transmission and reception in comparison with wire communication. Accordingly, technologies to overcome the weak points in transmission and reception of data between mobile devices have been developed.

Among them, a technology to secure the efficiency in transmission and reception of data includes a technology for easily and simply transmitting data that the user wants to transmit to other mobile devices or receiving the data from other mobile devices. In order to transmit and receive data between mobile devices, the process of setting a transmission channel is needed. This process is referred to as pairing. Once a transmission channel is set, the efficiency of transmission and reception of data depends on a communication protocol or a bandwidth. Accordingly, efficient pairing corresponds to easily and simply securing a channel for transmitting and receiving data. In particular, general users who do not have technical knowledge can easily enter a data transmission environment. Today, in info-communication environments, since general users who do not have technical knowledge need to easily transceive data using mobile devices, a method for easily and simply performing the pairing process is requested. The various embodiments of the present disclosure will provide several solutions to the request.

Before describing the various embodiments of the present disclosure, related art pairing technologies are simply introduced and problems of the related art technologies are discussed.

FIG. 1 is a conceptual diagram of a data transceiving structure of a mobile device according to the related art.

As shown in FIG. 1, a related art mobile device 10 communicates with an external apparatus (for example, a server 30) through an Access Point (AP) 20. The mobile device 10 and server 30 need to perform a process of authenticating each other. In an embodiment, the AP 20 may be connected to the server 30 through a wire network, and may be connected to the mobile device 10 through a wireless network. The mobile device 10 exchanges data with the AP 20, using diverse local area communication technologies, and the AP 20 connects the mobile device 10 and the server 30. At this time, the mobile device 10 has to have an authentication key for authentication with the server 30. For example, a public key technology may be used.

The mobile device 10 has to obtain the authentication key, and the authentication key has to be encrypted. The authentication process may be actually complicated to a certain extent. Accordingly, since it takes time to set a channel for transceiving data due to the complicated authentication process, the efficiency of transceiving data using the mobile device 10 may be reduced.

In addition, the complexity in the authentication process makes it inconvenient for a general user of the mobile device 10 who does not have technical knowledge. The user has to perform complicated manipulations to the mobile device 10 in order to connect the mobile device 10 to the server 30, and has to be authenticated as a right user by entering a password or an Identification (ID).

Furthermore, this authentication method has an essential weak point in that when a key becomes public, the security collapses. Even when the same authentication key is used, it is not secured that the user is a unique authenticated user.

Accordingly, many engineers are researching a pairing method of a mobile device to efficiently exchange data and solve the security issue through easy and convenient authentication. A method commercially referred to as 'bump' as shown in FIG. 2 suggests a solution.

FIG. 2 is a reference diagram of a related art pairing method of a mobile device to transceive data using motion information of the mobile device according to the related art.

With reference to FIG. 2, the mobile device 10 detects its location using a location sensing technology using a Global Positioning System (GPS) 40. Subsequently, when the mobile device 10 bumps into another mobile device 10', the mobile device 10 transmits motion information detected by a motion sensor (for example, an acceleration sensor), time information regarding the bumping time, and the detected location information to a server 30. The mobile device 10' also transmits location information, motion information, and time information to the server 30 in the same method. The server 30 receives the data from one of the mobile devices 10 and 10', and transmits the received data to the other mobile device 10 or 10' which has the same time information and location information and corresponding motion information.

The pairing method as shown in FIG. 2 provides more enhanced convenience than the method as shown in FIG. 1. The user of the mobile device 10 may conveniently transmit desired data to another mobile device 10'. In other words, the user may simply transmit data to another mobile device 10' by bumping into the mobile device 10' without entering a password or an ID so that the transmitting process (the pairing process) may be simplified. In addition, since the data are transmitted or received between the user terminal 10 of the user and another terminal which directly bumps into the user terminal 10, the risk of leaking data may be reduced unless the user terminal 10 is lost or the data are eavesdropped in the transmission process.

However, since the pairing method as shown in FIG. 2 performs pairing by bumping the user terminals, errors may occur according to the bumping conditions. For example, when a user terminal which bumps into another user terminal externally receives force and thereby has another motion, the user terminal does not obtain motion information corresponding to another user terminal. In this case, it is impossible to set a channel for transmitting or receiving data by bumping. Accordingly, since this pairing method has a high possibility of causing an error in the pairing process, it is difficult to set a channel efficiently.

In addition, it may be inconvenient to exchange data between many user terminals using this method. First of all, it is impossible for all of the user terminals to bump into one another in reality at the same time. In addition, it is cumbersome for all of the user terminals to individually bump into each other. Even though all of the user terminals bump into one another, it is difficult for all of the user terminals to obtain the same or matching motion information. Accordingly, it is difficult to easily and quickly transmit or receive data between the many user terminals in the pairing method as shown in FIG. 2.

Therefore, there is a need for a new data transceiving method which enables simple and easy pairing, unlike the related art technologies as shown in FIGS. 1 and 2, has a low possibility of causing pairing errors, and allows convenient data transmission and reception among a plurality of user terminals.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal, an external apparatus, a data transceiving system, and a data transceiving method to perform simple and easy pairing, have a low possibility of causing pairing errors, and allow convenient data transmission and reception among a plurality of user terminals.

In accordance with an aspect of the present disclosure, a user terminal is provided. The user terminal includes a communicator configured to communicate with an external apparatus, a sound detector configured to detect a sound around the user terminal during a period of time, a location detector configured to detect a location of the user terminal during the period of time, and a controller configured to transmit information regarding the detected sound and the detected location to the external apparatus, and transmit data relevant to a user group determined based on the information regarding the detected sound and the detected location to the external apparatus or receive the data from the external apparatus.

The external apparatus may receive the information regarding the detected sound and the detected location from a plurality of user terminals, and determine that among the plurality of user terminals, user terminals having a same sound pattern in a same period of time and at a same location belong to a same user group.

The external apparatus may determine the user group by comparing patterns of the detected sounds by the plurality of user terminals in a Least Mean Square (LMS) method.

The external apparatus may be at least one of a server, an Access Point (AP), and a user terminal.

The user terminal may further include an inputter configured to receive a user command, wherein the controller may receive a list of the data from the external apparatus and selects data to transmit or receive according to the user command from the list of the data.

The data may be at least one of contact information, image contents, multimedia contents, Uniform Resource Locators (URLs), text information, and documents.

The controller may transmit or receive the data relevant to the user group restrictively according to a security setting state of the user terminal and the external apparatus.

In accordance with another aspect of the present disclosure, an external apparatus is provided. The external apparatus includes a communicator configured to communicate with at least one user terminal, and a controller configured to receive information regarding a sound and a location detected by the at least one user terminal, determine a user group based on the received information regarding the detected sound and the detected location, and transceive data relevant to the determined user group with the at least one user terminal.

The controller may determine that from among the at least one user terminal which transmits the information regarding the detected sound and the detected location, user terminals having a same sound pattern in a same period of time and at a same location belong to a same user group.

In accordance with another aspect of the present disclosure, a data transceiving system is provided. The data transceiving system includes a user terminal configured to detect a sound around the user terminal and a location during a period of time and transmit information regarding the detected sound and the detected location to an external apparatus, and the external apparatus configured to receive the information regarding the detected sound and the detected location, determine a user group based on the received information regarding the detected sound and the detected location, and transceive data relevant to the user group with the user terminal.

In accordance with another aspect of the present disclosure, a data transceiving method is provided. The data transceiving method includes detecting a sound around a user terminal during a period of time, detecting a location of the user terminal during the period of time, transmitting information regarding the detected sound and the detected location to an external apparatus, and transmitting data relevant to a user group determined based on the information regarding the detected sound and the detected location to the external apparatus or receiving the data from the external apparatus.

The external apparatus may receive the information regarding the detected sound and the detected location from a plurality of user terminals, and determine that among the plurality of user terminals, user terminals having a same sound pattern in a same period of time and at a same location belong to a same user group.

The external apparatus may determine the user group by comparing patterns of the sounds detected by the plurality of user terminals in a Least Mean Square (LMS) method.

The external apparatus may be at least one of a server, an AP, and a user terminal.

The operation of transmitting or receiving the data may include receiving a list of the data from the external apparatus, receiving a user command, and selecting data to transmit or receive according to the user command from the list of the data.

The data may be at least one of contact information, image contents, multimedia contents, URLs, text information, and documents.

In the operation of transmitting or receiving the data, the data relevant to the user group may be transmitted or received restrictively according to a security setting state of the user terminal and the external apparatus.

In accordance with another aspect of the present disclosure, a data transceiving method is provided. The data transceiving method includes receiving information regarding a sound and a location detected by the at least one user terminal, determining a user group based on the received information regarding the detected sound and the detected location, and transceiving data relevant to the determined user group with the at least one user terminal.

In the operation of determining the user group, it may be determined that from among the at least one user terminal which transmits the information regarding the detected sound and the detected location, user terminals having a same sound pattern in a same period of time and at a same location belong to a same user group.

In accordance with another aspect of the present disclosure, a data transceiving method is provided. The data transceiving method of a user terminal includes identifying another user terminal in a range and generating a user terminal list, detecting a sound in the range, transmitting information regarding characteristics of the detected sound to the another user terminal, and transmitting data to the another user terminal or receiving data from the another user terminal if a response message indicating that characteristics of a voice of a user of the another user terminal are similar to the characteristics of the detected sound received from the another user terminal.

In accordance with another aspect of the present disclosure, a data transceiving method is provided. The data transceiving method of a user terminal includes receiving information regarding characteristics of a sound detected in a range by another user terminal in the range, determining similarity between characteristics of a voice of a user of the user terminal and the characteristics of the detected sound, transmitting information regarding the determined similarity to the another user terminal, and transmitting data to the another user terminal or receiving data from the another user terminal when the characteristics of the voice of the user of the user terminal are similar to the characteristics of the detected sound.

In determining the similarity, whether the detected sound is the voice of the user of the user terminal may be determined based on at least one of vocal cord frequency characteristics, voice tone, and phonemic characteristics.

According to the various embodiments of the present disclosure, the present disclosure provides a user terminal, an external apparatus, a data transceiving system, and a data transceiving method to perform simple and easy pairing, have a low possibility of causing pairing errors, and allow convenient data transmission and reception among a plurality of user terminals.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
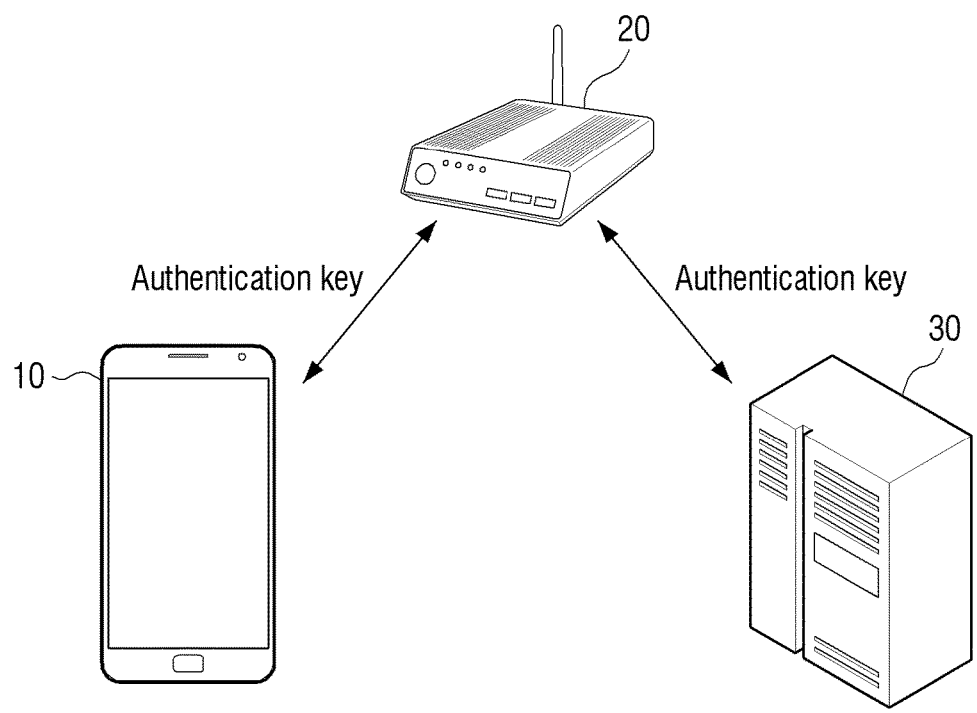
FIG. 1 is a conceptual diagram of a data transceiving structure of a mobile device according to the related art.
Figure 2:
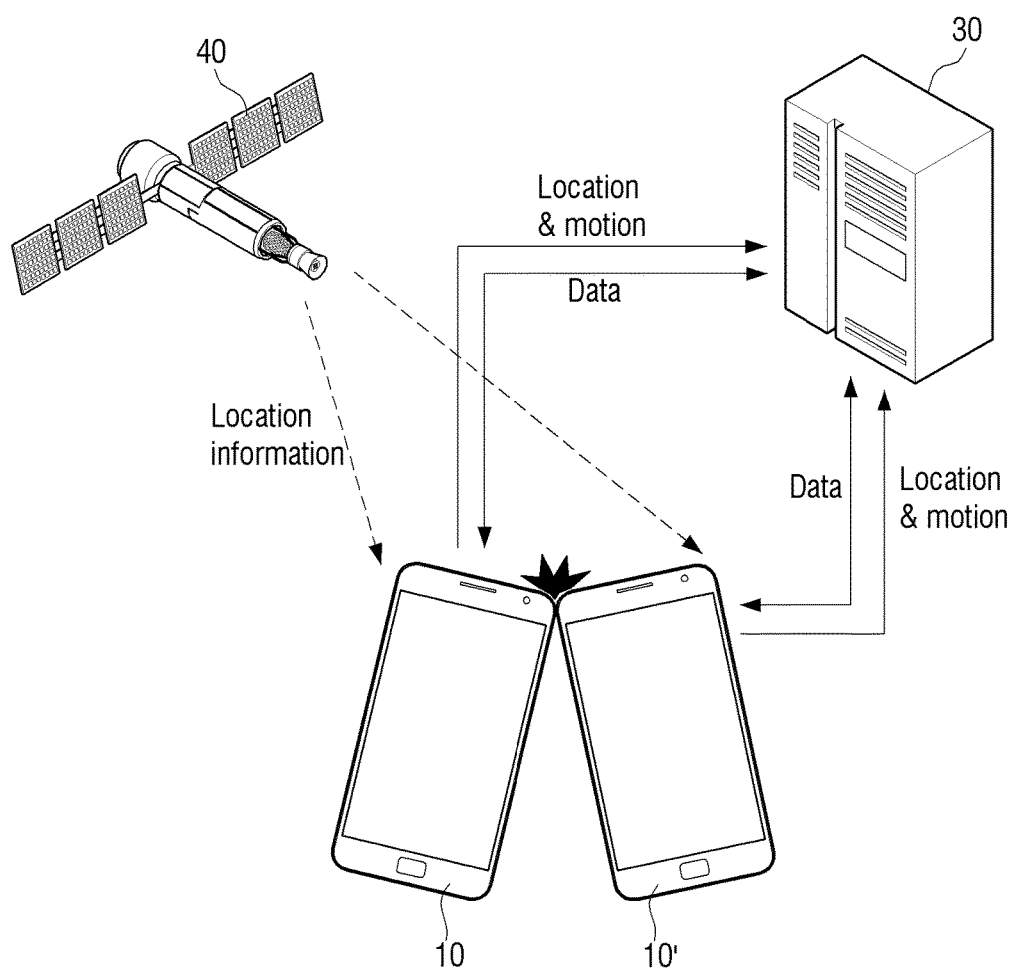
FIG. 2 is a reference diagram of a related art pairing method of a mobile device to transceive data using motion information of the mobile device according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, same drawing reference numerals are used for the same elements even in different drawings. The matters defined in the description, such as detailed construction and elements, are provided to assist in a comprehensive understanding of the disclosure. Thus, it is apparent that the various embodiments of the present disclosure can be carried out without those specifically defined matters. Also, well-known functions or constructions are not described in detail since they would obscure the disclosure with unnecessary detail.

Operation of a Data Transceiving System

Figure 3:
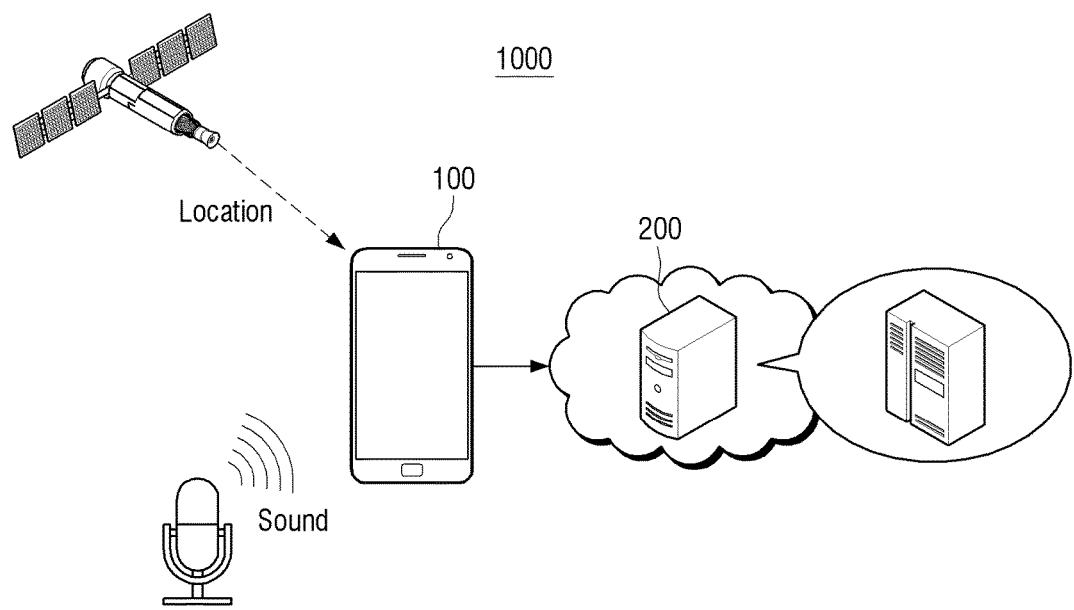
FIG. 3 is a conceptual diagram of a data transceiving system according to an embodiment of the present disclosure.
Figure 4:
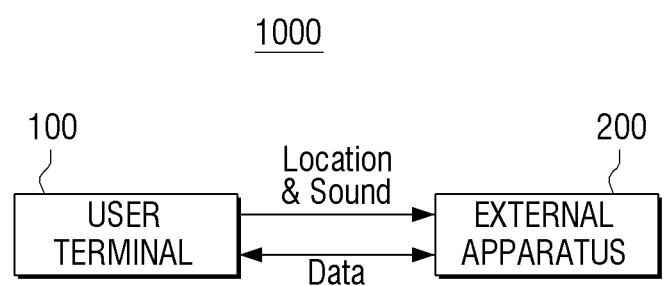
FIG. 4 is a block diagram of a configuration shown in FIG. 3 according to an embodiment of the present disclosure.

FIG. 3 is a conceptual diagram of a data transceiving system 1000 according to an embodiment of the present disclosure. FIG. 4 is a block diagram of a configuration shown in FIG. 3 according to an embodiment of the present disclosure.

With reference to FIGS. 3 and 4, the data transceiving system 1000 consistent with an embodiment of the present disclosure may include at least one user terminal 100 and an external apparatus 200 which transceives data with the user terminal 100. The user terminal 100 detects a sound around the user terminal 100 and a location during a period of time, and transmits the detected information regarding the sound and the location to the external apparatus 200. The external apparatus 200 receives the detected information, determines a user group based on the received information, and transceives data relevant to the user group with the user terminal 100.

Detailed configuration and operation of the user terminal 100 and the external apparatus 200 are described below in greater detail.

Operation of the User Terminal 100

Figure 5:
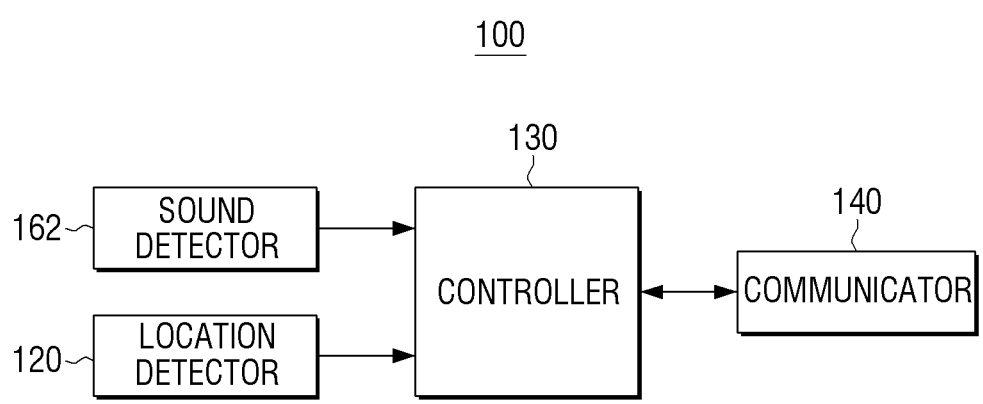
FIG. 5 is a block diagram of a configuration of a user terminal according to an embodiment of the present disclosure.

FIG. 5 is a block diagram of a configuration of a user terminal 100 according to an embodiment of the present disclosure.

The user terminal 100 includes a display which consists of one or more touch screens. The user terminal 100 is a device which is able to execute an application or display contents. For example, the user terminal 100 may be at least one of a tablet Personal Computer (PC), a Portable Multimedia Player (PMP), a Personal Digital assistant (PDA), a smart phone, a cellular phone, and a digital picture frame. The various embodiments of the present disclosure are described with reference to the user terminal 100 which is implemented with a cellular phone or a smart phone, but the present disclosure is not limited thereto.

With reference to FIG. 5, the user terminal 100 consistent with an embodiment of the present disclosure may include a communicator 140, a sound detector 162, a location detector 120, and a controller 130.

The communicator 140 communicates with the external apparatus 200. More specifically, the communicator 140 transceives information with the external apparatus 200 through a short distance network or a long distance network. The external apparatus 200 may be at least one of a server, an Access Point (AP), and another user terminal.

For example, let's suppose the external apparatus 200 is a server. The user terminal 100 communicates with an AP through the short distance network. The user terminal 100 communicates with the server through the AP. In the embodiment, the user terminal 100 is able to move, and wirelessly communicates with the AP which is adjacent thereto. The AP may be connected to the server through a wire communication including the internet.

The communicator 140 may be implemented in diverse short distance communication technologies, for example, Wireless Fidelity (WIFI). In this case, the communicator 140 may include a WIFI module.

The WIFI module performs short distance communication which complies with the IEEE 802.11 technical standard. According to the IEEE 802.11 technical standard, wireless communication technologies of a band spread method referred to as Single Carrier Direct Sequence Spread Spectrum (DSSS), and an orthogonal frequency division method referred to as Multi Carrier Orthogonal Frequency Division Multiplexing (OFDM) are used. In other words, data transmission is performed by tuning a noise signal using frequency spread, and bulk data transmission is performed using a plurality of orthogonal frequencies. In IEEE802.11n standard, data may be transmitted at up to 150 Mbps, and if a Multiple-Input and Multiple-Output (MIMO) technology to increase output using a plurality of antennas is applied, data may be transmitted at up to 600 Mbps.

In another embodiment, the communicator 140 may be implemented in diverse mobile communication technologies. That is, the communicator 140 may include a cellular communication module 141 which enables data transmission and reception using an existing wireless communication network.

For example, the $3^{rd}$ Generation (3G) mobile communication technology may be applied. That is, at least one of Wideband Code Division Multiple Access (WCDMA), High Speed Downlink Packet Access (HSDPA), High Speed Uplink Packet Access (HSUPA), and High Speed Packet Access (HSPA) may be applied. In the case of HSPA, data may be downloaded at up to 14.4 Mbps, and be uploaded at up to 5.8 Mbps.

In addition, $4^{th}$ Generation (4G) mobile communication technology may be applied. 2.3 GHz (portable internet) mobile WiMAX and Wireless Broadband Internet (WiBro) are internet technologies which are able to be used even when moving at a high speed, and has recently come into focus. These technologies have the advantages of 3G mobile communication technology (HSPA) and WLAN, and thereby have a transmission rate of up to 180 Mbps. In addition, 4G Long Term Evolution (LTE) may be applied. LTE is extended technology of WCDMA, and is based on Orthogonal Frequency Division Multiple Access (OFDMA) and MIMO. Since LTE utilizes WCDMA, there is an advantage of using the existing network. LTE reduces a signal delay time between a terminal and a system to 1 ms which is 2 ms faster than HSPA, and secures a speed of up to 350 km/h in movement. The 4G mobile communication technology adopts OFDMA as a wireless access method, uses a 64QAM modulation method, and is based on multiple antenna technology in common so that the transmission rate may be secured in movement and multimedia communication may be provided.

As described above, the communicator 140 of the user terminal 100 may use WiMAX, WIFI, 3G, or LTE having a broad bandwidth and a high efficiency, but does not exclude other short distance communication technologies.

That is, the communicator 140 may include at least one of a local communication module 143 such as a Bluetooth module, an Infrared Data Association (IrDA) module, a Near Field Communication (NFC) module, and a Zigbee module, and a WLAN module 142.

The Bluetooth module transmits a data stream in a data packet form using a total of 79 channels, 2402-2480 MHz, excluding 2 MHz after 2400 MHz and 3.5 MHz prior to 2483.5 MHz. If a frequency hopping method of moving fast from a plurality of channels in a predetermined pattern and transmitting a packet (data) bit by bit is used, it is possible to hop 79 channels 1600 times a second.

The IrDA module transmits data using infrared light. Since infrared light has a longer wavelength than visible light, infrared light may smoothly penetrate particles suspended in the air. In particular, since infrared light easily secures a broader bandwidth than radio waves, infrared light enables high-speed data transmission. According to IrDA data 1.4 standard, the user terminal 100 may perform wireless data communication with the external apparatus 200 at up to 16 Mbps within 1 meter of the external apparatus 200.

The NFC communication module performs communication in noncontact short distance wireless communication method using a 13.56 Mz frequency band. Using the NFC technology, when a plurality of terminals approach to one another within a short distance such as approximately 10 cm, data may be transceived. In this case, the external apparatus 200 may include a module including an NFC tag, and the user terminal 100 may include an NFC reader. Accordingly, when tagging is performed, data are transmitted from the external apparatus 200 to the user terminal 100. For transmission and reception of information, each of the external apparatus 200 and the user terminal 100 may include an NFC tag and an NFC reader.

The WLAN module 142 accesses a wireless AP which exists in a predetermined range and is connected to the internet according to control of the controller 130. The WLAN module 142 supports the WLAN standard (IEEE802.11x) of the Institute of Electrical and Electronics Engineers (IEEE).

The communicator 140 may include a Zigbee module. Zigbee is a short distance communication method which complies with the IEEE802.15.4 technology standard, and has transmission speeds of 250 Kbps, 20 Kbps, and 40 Kbps. This method is suitable for comparatively simple data transmission.

The communicator 140 may be implemented in diverse communication methods as described above or adopt other communication technologies which are not mentioned in the above if necessary.

In view of the configuration of the user terminal 100, the sound detector 162 detects a sound around the user terminal 100. The sound detector 162 collects a sound wave around the user terminal 100 and converts the sound wave into an electrical current according to vibration. The sound detector 162 may include diverse types of microphone. For example, the sound detector 162 may include at least one of a dynamic microphone, a condenser microphone, a piezoelectric microphone which uses a piezoelectric phenomenon, a carbon microphone which uses a contact resistance of a carbon granule, a (non-directional) pressure microphone which generates output in proportion to sound pressure, and a bidirectional microphone which generates output in proportion to sound particle velocity.

The sound detector 162 detects a sound around the user terminal 100 during a period of time. Even when the location of the user terminal 100 and a detected sound around the user terminal 100 are the same as described below, it may not be secured that the user of the user terminal 100 is an authorized user (for example, when it is eavesdropped). Accordingly, the sound detector 162 detects a sound from a start time until a finish time. Although the sound detector 162 may detect a sound over the period of time according to the circumstances, the external apparatus 200 may sample only the period of time and determine similarity with other user terminals. This will be described below in greater detail together with description of the controller 130.

The location detector 120 detects the location of the user terminal 100. The location detector 120 includes a GPS module. The GPS module may receive radio waves from a plurality of GPS satellites 40 moving around the earth, and calculate the location of the user terminal 100 using a time of arrival from the GPS satellites 40 to the multi-display apparatus 100 and GPS parameters. The user terminal 100 may detect the current location information using the GPS module.

A method for determining location information using the user terminal 100 is not limited thereto. In other words, the location information may be determined using a cell method and a short distance communication method as well as the GPS method. The communicator 140 may transmit the determined location information through a long distance communication network or a short distance communication network. The GPS method is a technology of detecting the location of the user terminal 100 using the satellite 40, and thus may find a comparatively broad range of location, but may not track a detailed location such as distinction of the inside or outside of a building. In this case, detailed location information may be obtained by adding the cell method of finding the location of the user terminal 100 using a repeater (not shown). In order to obtain the detailed location information of the user terminal 100, diverse location determination technologies need to be used in combination. Using the repeater (or the AP), the current location of the user terminal 100 may be determined by transmitting a signal to the repeater through the communicator 140 and receiving a signal including location information of the repeater from the repeater. In this case, the aforementioned short distance communication technology or mobile communication technology may be used.

For example, if the user of the user terminal 100 is in a meeting room on the $8^{th}$ floor of building A in front of the Seoul National University of Education, it is determined that the user is in building A using the GPS method, and that the user is in the meeting room on the $8^{th}$ floor using the cell method. For more precise location determination, NFC may be used. In order to implement the present disclosure, other location determination technologies as well as the aforementioned location determination technologies may also be used, and the present disclosure does not exclude those various embodiments.

The location detector 120 detects the location of the user terminal 100 during a period of time. Even when the location of the user terminal 100 and the detected sound around the user terminal 100 are the same as described below, it may not be secured that the user of the user terminal 100 is an authorized user (for example, when it is eavesdropped). Accordingly, the location detector 120 detects the location from a start time until a finish time. Although the location detector 120 may detect the location over the period of time according to the circumstances, the external apparatus 200 may sample only the period of time and determine similarity with other user terminals. This will be described below in greater detail together with description of the controller 130.

The controller 130 controls the overall operation of the user terminal 100. More specifically, the controller 130 controls the communicator 140 to transmit information regarding the sound detected by the sound detector 162 and information regarding the location detected by the location detector 120 to the external apparatus 200. The data may be at least one of contact information, image contents, multimedia contents, URLs, text information, and documents.

The user terminal 100 transmits information regarding the sound and the location detected by the aforementioned transmission. For example, if the user having a smart phone (the user terminal 100) is in a meeting room, the user may record an announcement of the meeting room by manipulations of the smart phone, and acquire information regarding the current location (meeting room) of the user by running the GPS module of the smart phone. The smart phone transmits the recorded announcement and the current location information to the external apparatus 200.

The controller 130 controls the communicator 140 to transmit data relevant to a user group determined based on the detected information regarding the sound and the location to the external apparatus 200 or receive the data from the external apparatus 200.

Determining a user group is performed by the external apparatus 200. In other words, the external apparatus 200 receives the detected information regarding the sound and the location from the external apparatus 200 from a plurality of user terminals 100 and groups the user terminals 100 having the same sound and location. More specifically, the external apparatus 200 determines user terminals having the same sound pattern during the same period of time and at the same location from among the plurality of user terminals 100 to become the same user group.

In order to compare sound patterns, diverse pattern matching methods may be used. That is, the external apparatus 200 analyzes frequencies of sounds which are detected and transmitted by the plurality of user terminals 100, and determines that user terminals 100 having similar frequency patterns are located at the same location. In this case, the external apparatus 200 further considers location information transmitted from the user terminals 100 as well as the frequency patterns. In an embodiment, sound patterns may be compared using a Least Mean Square (LMS) method.

Sound patterns are compared with respect to the same period of time. The reason is to guarantee that sounds received from the plurality of user terminals 100 are the same sounds. In other words, a sound is detected in the period of time. The period of time has at least three meanings.

Firstly, the user manipulates the user terminal 100 and records a sound between time points. For example, the user in a meeting room may record a sound of the meeting room using his user terminal 100 between 12:10:00 AM and 12:12:00 AM. Another user in the meeting room may record the sound of the meeting room at the same time. In the process of collecting a sound, a period of time for sounds to be compared is set to be the same.

There may be a time synchronization problem among the different user terminals 100. Each user terminal 100 includes a real-time chip (RTC) and obtains information on a current time from the RTC. Based on the time information provided by the RTC, sounds are detected. However, the problem is whether the RTCs of the different user terminals 100 provide the same time information. If the user terminals 100 use a mobile communication network and receive the current time information from a base station periodically, a time error among the user terminals 100 may not occur. However, the problem is that such a service is not provided. For example, in the case of a tablet PC which is not used for mobile communication, current time information provided by the tablet PC may differ from current time information of the user terminal 100 (for example, a smart phone) of another user. In order to solve this problem, when the user starts detecting a sound by manipulation of the user terminal 100, the controller 130 of the user terminal 100 may automatically receive current time information from an external server (or the external apparatus 200 of the present disclosure). The user terminal 100 adjusts a current time of the RTC to coincide with the received current time information and detects a sound based on the adjusted current time. However, in general, since the user terminal 100 has its own RTC and power supply, there is almost no time error.

Secondly, the external apparatus 200 samples sounds received from the plurality of user terminals 100. This is because there may be a little bit of error in the sound detecting time of each user terminal 100. In the above embodiment, the external apparatus 200 may receive a sound of the meeting room from user terminal A between 12:10:00 AM and 12:12:00, and may receive a sound of the meeting room from user terminal B between 12:10:02 AM and 12:12:02. This difference may occur by an error in the user's manipulation to user terminal B. In this case, the external apparatus 200 samples only the sounds of the meeting room between 12:10:02 AM and 12:12:00 AM from among the sounds received from each user terminal, and determines the similarity.

Thirdly, the sounds detected from the plurality of user terminals 100 have to be transmitted to the external apparatus 200 at a similar time. That is, the external apparatus 200 has to receive the sounds from the plurality of user terminals 100 at the similar time. The reason is that if patterns of the detected sounds are similar, the locations of the user terminals 100 are the same, and the detected time information is similar, but if the transmission times are different, the users of the user terminals 100 which transmits the sounds may not be guaranteed as authorized users. For example, an unauthorized user may eavesdrop on a previously recorded sound and transmit the recorded sound to the external apparatus 200. Accordingly, sounds have to be transmitted in real time (or at a similar time).

Figure 6:
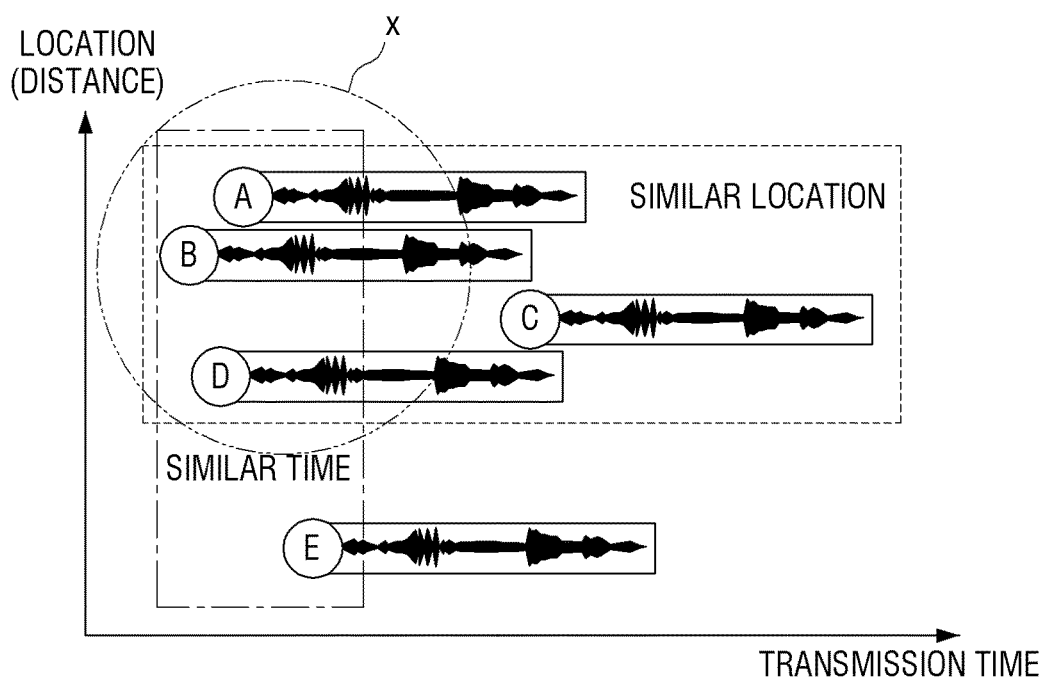
FIG. 6 is a graph illustrating a sound pattern comparing method according to an embodiment of the present disclosure.

FIG. 6 is a graph illustrating a sound pattern comparing method according to an embodiment of the present disclosure.

1) User terminals A, B, C and E have similar sound patterns. However, user terminal D has a different sound pattern. Accordingly, user terminal D is not recognized as a user terminal located at the same location.

2) It is shown that time sections of sounds collected by each user terminal are different. However, the external apparatus 200 compares only time sections in which sound patterns of each user terminal 100 overlap and determines the similarity. Accordingly, user terminals A, B, C and E may be recognized to have similar sound patterns.

3) Each user terminal 100 has to transmit the collected sounds in real time. If the transmission time is too late, the sound collected in the same time area does not guarantee that the user terminal 100 is at the same location at the same time.

4) As described above, each user terminal 100 transmits the location information of the user terminal 100 detected by the location detector 120 to the external apparatus 200. If sound patterns are the same, and transmission times are similar, but if location information transmitted from the user terminals 100 are different, the user terminals 100 are not recognized as the user terminals which exist at the same location and at the same time. Accordingly, since user terminal C has location information different from user terminals A and B, user terminal C cannot belong to the same user group as user terminals A and B.

5) As determined above, only user terminals A and B belong to the same user group.

Figure 7:
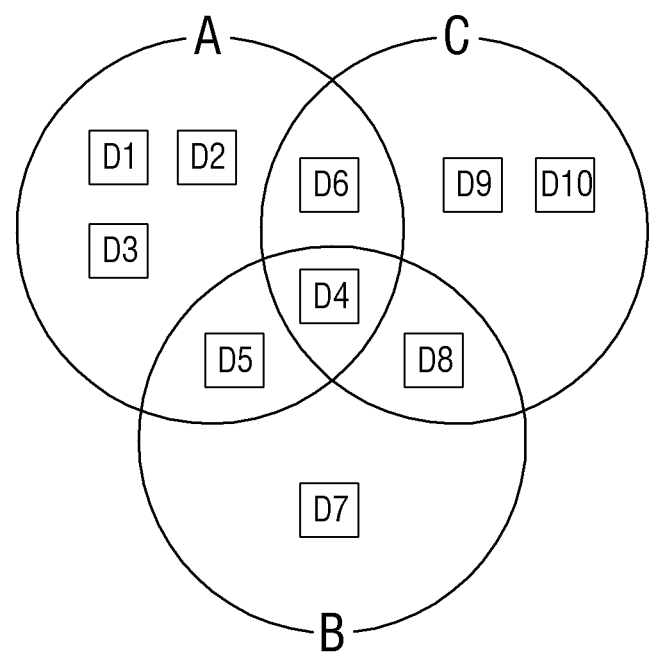
FIG. 7 illustrates user groups determined based on detected information regarding a sound and a location according to an embodiment of the present disclosure.

FIG. 7 illustrates user groups determined based on the detected information regarding the sound and the location according to an embodiment of the present disclosure.

As shown in FIG. 7, a plurality of user groups may be determined based on information regarding sounds and locations which are detected by the user terminals 100 during a period of time. There may be a plurality of user groups A, B and C, and a single user terminal may belong to a plurality of user groups. For example, user terminal D6 may belong to user groups A and C. In this case, user groups A and C have the same sound in a period of time but have different location information. Similarly, user terminal D4 may belong to user groups A, B, and C.

Figure 8:
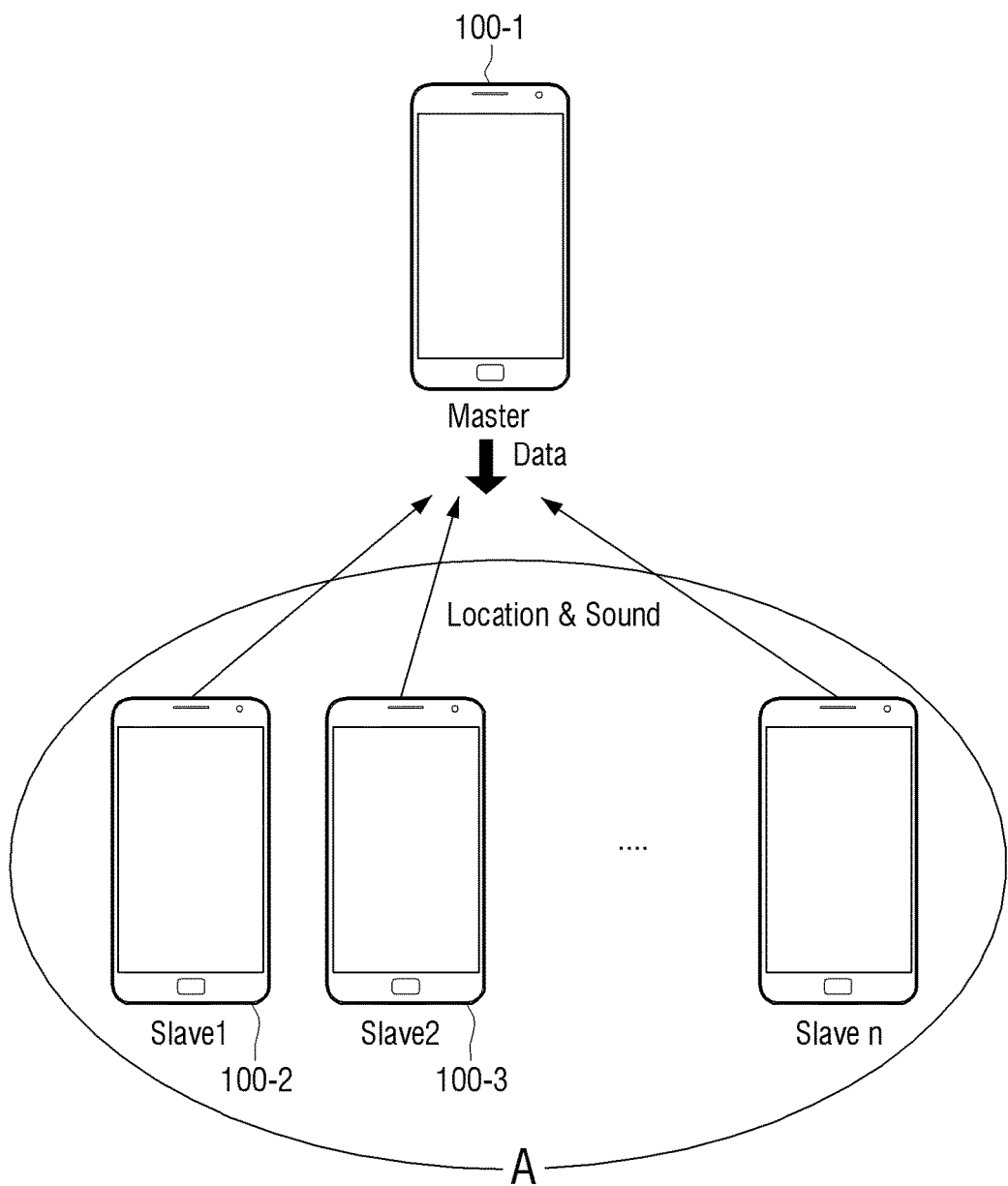
FIG. 8 is a conceptual diagram of a data transceiving system according to another embodiment of the present disclosure.

FIG. 8 is a conceptual diagram of a data transceiving system according to another embodiment of the present disclosure.

In the aforementioned embodiment, the external apparatus 200 may be at least one of a server, an AP, and a user terminal That is, the external apparatus 200 may be a server which is connected through an AP or may be another user terminal.

In this case, the user terminal 100-1 detects a sound around the user terminal 100-1 and a location during a period of time and transmits the detected information to the another user terminal. The another user terminal receives information regarding sounds and locations from the plurality of user terminals 100-2, 100-3, . . . , and N, determines a user group based on the received information, and transceives data relevant to the determined user group with the plurality of user terminals 100-2, 100-3, . . . , and N. In other words, the plurality of user terminals 100-2, 100-3, . . . , and N act as slave devices, and the another user terminal 100-1 acts as a master device, manages information regarding the slave devices, and controls transmission and reception. FIG. 8 illustrates this embodiment.

In this case, the user terminals 100-2, 100-3, . . . , and N do not use an access point but uses direct communication among the user terminals, and the aforementioned diverse short distance communication methods may be used.

Figure 9:
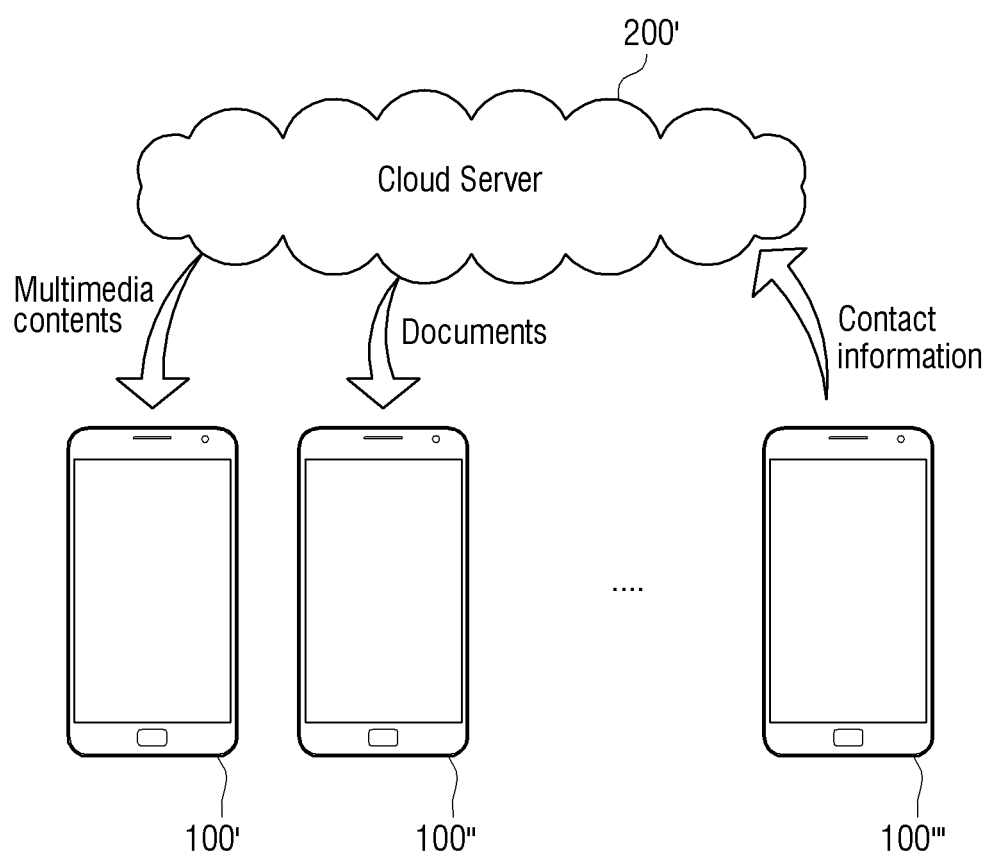
FIG. 9 is a conceptual diagram of a data transceiving system according to yet another embodiment of the present disclosure.

FIG. 9 is a conceptual diagram of a data transceiving system according to yet another embodiment of the present disclosure.

In FIG. 9, the external apparatus 200 is a cloud server 200'. In a meeting room, when a user transmits data to another user or receives data from another user using the user terminal 100, a bulk buffer may be needed. In particular, when bulk multimedia content is transmitted between the plurality of user terminals, the external apparatus 200 may be implemented with a cloud server 200'. Each user terminal 100', 100", and 100'" transmits sounds and location information which are detected during a period of time to the cloud server 200', and the cloud server 200' analyzes the information and performs authentication in the aforementioned method so that data starts being transmitted. Each user terminal 100', 100", and 100'" stores data to distribute to other users in the cloud server 200', and downloads data which are transmitted from other users and are stored in the cloud server 200' from cloud server 200'.

The cloud server 200' may consider at least two points in terms of personal information protection.

Firstly, the cloud server 200' stores transceived data temporarily. That is, the cloud server 200' stores data transmitted from user terminal 100', and provides the data when another user terminal 100" requests the data. However, in a situation where the data does not need to be transceived such as when the meeting finishes, the cloud server 200' deletes the data completely. This may be a big issue when the data includes personal information.

For example, the present inventive concept may be used when exchanging personal contacts or information in a meeting or gathering. For efficiency of data transmission and reception, the external device 200 may become the cloud server 200', and the user may receive other people's contacts or personal information easily and fast using his user terminal 100', 100", or 100'". In this case, when a situation where the data are transceived finishes, the personal information is completely deleted from the cloud server 200'.

Secondly, the aforementioned grouping may be performed at certain time intervals. When grouping is performed, the cloud server 200' basically allows access of authorized users. However, if data are open in a state where a communication path is continuously connected, there may be the risk of leakage of data in eavesdropping. Accordingly, the aforementioned grouping may be performed at certain time intervals, and opening and closing the communication path may be repeated.

Figure 10:
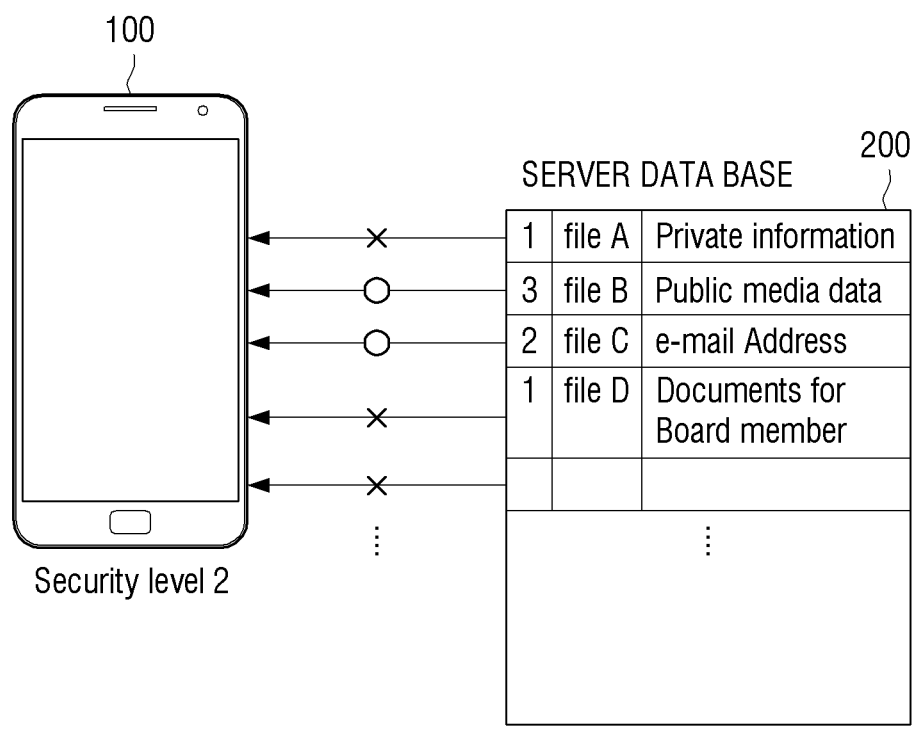
FIG. 10 is a reference diagram of a method for limiting transmission and reception of data between an external apparatus and a user terminal according to an embodiment of the present disclosure.

In the similar context, a method for limiting data transmission and reception according to characteristics of data or grouping may be considered. FIG. 10 illustrates such an embodiment.

FIG. 10 is a reference diagram of a method for limiting transmission and reception of data between the external apparatus 200 and the user terminal 100 according to an embodiment of the present disclosure.

According to various embodiments of the present disclosure, according to a security setting state of the user terminal 100 and the external apparatus 200, data relevant to a user group determined by the external apparatus 200 may be transmitted or received restrictively. That is, if the security level is high, transmission and reception of data needs to be limited, and if the security level is low, the limit needs to be relaxed.

In the embodiment as shown in FIG. 9, the security level of the user terminal 100 is set to 2. It is assumed that the lower the security level, the higher the necessity of security. When the security level is 2, it is possible to transceive data having the same or higher security level, but it is impossible to transceive data having a lower security level. For example, the external apparatus 200 (for example, a server) stores diverse types of files A, B, C, D and more. File A is personal information and has a security level of 1, and file D is a document for board of director and has a security level of 1, too. Since the security level of the user terminal 100 is 2, the user terminal 100 cannot receive files A and D. However, since file B is a common media file and has a security level of 3, and file C is an email address file and has a security level of 2, the user terminal 100 can receive files B and C. As described above, the risk of leakage of important information may be reduced by restricting transmission and reception of data according to the security setting state.

A Configuration of the User Terminal

A configuration of the user terminal 100 operating according to the above embodiments is described below. However, this is merely an embodiment, and other changeable various embodiments may be included.

Figure 11:
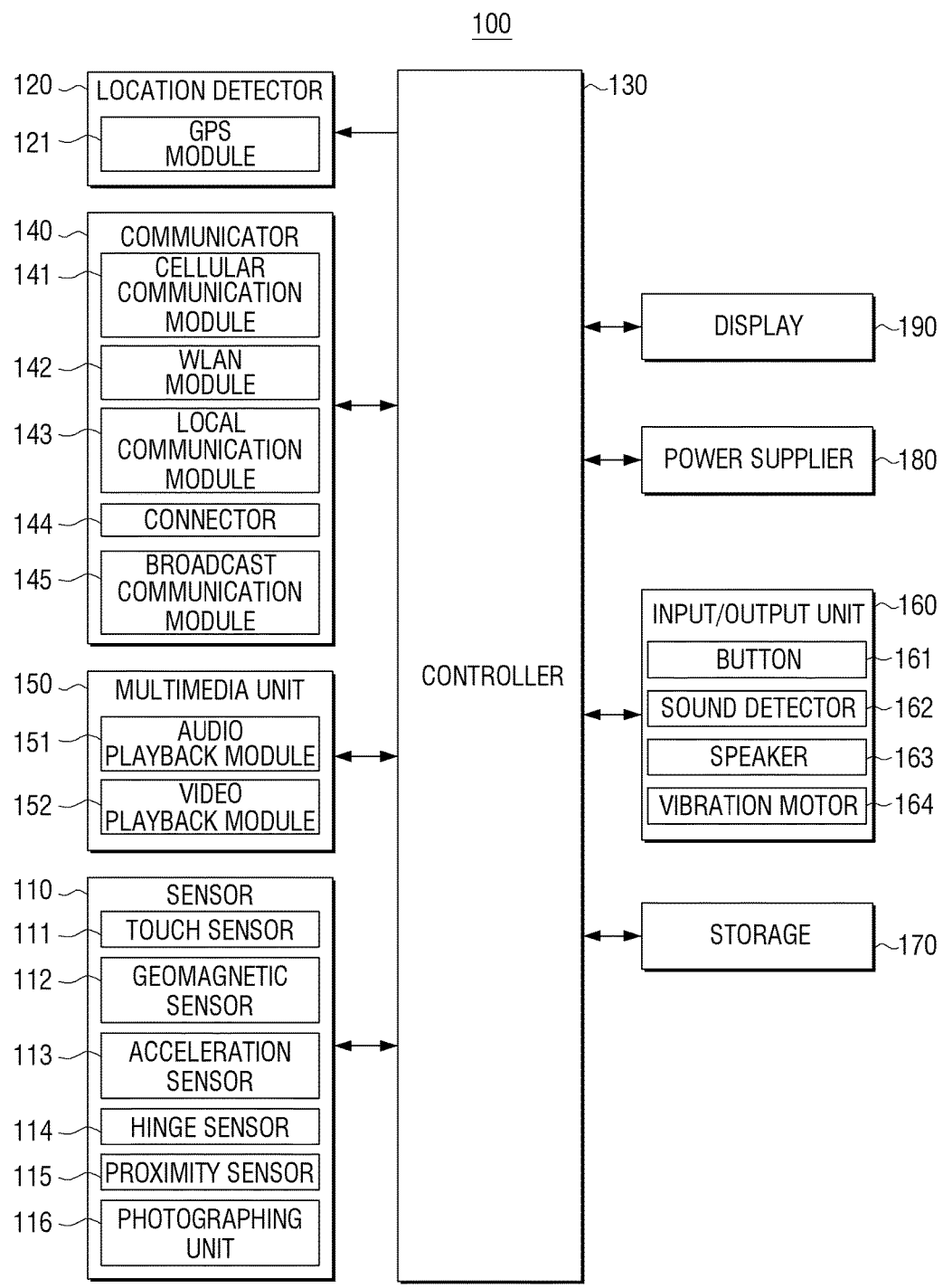
FIG. 11 is a block diagram of a configuration of a user terminal according to various embodiments of the present disclosure.

FIG. 11 is a block diagram of a configuration of the user terminal according to various embodiments of the present disclosure.

With reference to FIG. 11, the user terminal 100 according to the aforementioned various embodiments may include a communicator 140, a multimedia unit 150, a controller 130, a sensor 110, an input/output unit 160, a storage 170, a power supplier 180, and a display 190.

The communicator 140 transceives information with an external apparatus using diverse wire or wireless communication methods. The communicator 140 may include a WLAN module 141, and a broadcast communication module 145 as well as the aforementioned short distance communication module 143, and may further include a connector including at least one of an HDMI and a USB. In addition, according to the various embodiments, the communicator 140 may include the GPS module which composes the location detector 120.

The connector 144 provides interfaces for diverse devices, such as USB 2.0, USB 3.0, HDMI, IEEE 1394, and so on. The connector 144 may act as an interface to connect the user terminal 100 to an external apparatus (not shown) or a power source. According to control the controller 130, the user terminal 100 may transmit data stored in the storage 170 of the user terminal 100 to an external device or receive data from an external device through a cable which is connected to the connector 144. In addition, the user terminal 100 may receive power from a power source or charge its battery (not shown) through a cable which is connected to the connector 144.

The broadcast communication module 145 may receive broadcast signals (e.g. TV broadcast signals, radio broadcast signals, or data broadcast signals) and broadcast additional information (e.g. Electronic Program Guide (EPG) or Electronic Service Guide (ESG)) from a broadcasting station through a broadcast communication antenna (not shown) according to control of the controller 130.

The multimedia unit 150 plays back video content, audio content, and other diverse multimedia content. The multimedia unit 150 processes the multimedia content using a parser or a codec, and plays back the content. The multimedia unit 150 may include an audio playback module 151 and a video playback module 152.

The audio playback module 151 may play back a digital audio file (e.g. a file having a filename extension such as mp3, wma, ogg, or wav) which was stored or received according to control of the controller 130.

The video playback module 152 may play back a digital video file (for example, a file having a filename extension such as mpeg, mpg, mp4, avi, mov, or mkv) which is stored or received according to control of the controller 130. The video playback module 152 supports diverse forms of codecs to play back a digital video file. That is, the video playback module 152 plays back a video file using a pre-stored codec which is suitable for a codec format of the video file. The audio playback module 151 or the video playback module 152 of the multimedia module 150 may be included in the controller 130.

The controller 130 controls the communicator 140, the multimedia unit 150, the sensor 110, the input/output unit 160, the storage 170, the power supplier 180, and the display 190. The controller 130 may include a Central Processing Unit (CPU) which provides a clock to hardware and transmits a control signal, a memory which stores a process temporarily or semi-permanently, a Graphic Process Unit (GPU) which processes a graphic, and a system bus which transmits data among the memory, the CPU, and GPU. In addition, the controller 130 may further include an Operating System (OS) which drives the hardware components, and an application which provides a user interface on the OS and transmits the user interface to a framework. The components of the controller 130 will be described below in greater detail.

The sensor 110 senses diverse state changes such as an image, the user's touch on the user terminal 100, the user's movement, and the movement of the user terminal 100. The location detector 120 may be included in the sensor 110. The sensor 110 may include at least one of a photographing unit 116, a touch sensor 111, a proximity sensor 115, a geomagnetic sensor 112, an acceleration sensor 113, and a hinge sensor 114.

The photographing unit 116 takes a photograph of an object. The photographing unit 116 may include a shutter (not shown), a lens unit (not shown), an aperture (not shown), a Charge Coupled Device (CCD) image sensor (not shown), and an Analog to Digital Converter (ADC). The shutter adjusts an amount of incident light together with the aperture. The lens unit receives light from an external light source and processes an image. The aperture adjusts an amount of incident light according to a degree of opening or closing. The CCD image sensor accumulates the amount of light input through the lens unit and outputs an image taken by the lens unit to be suitable for a vertical synchronization signal according to the accumulated amount of light. Obtaining an image is performed by the CCD image sensor which converts light reflected from an object into an electrical signal. In order to obtain a color image using the CCD image sensor, a color filter is needed. A Color Filter Array (CFA) may be applied. The CFA passes only light representing one color, has a regularly arranged structure, and has diverse forms according to the arranged structure. The ADC converts an analog image signal output from the CCD image sensor into a digital signal.

The photographing unit 116 takes an image as described above, but this is merely an embodiment. An image may be taken in other methods. For example, an image may be taken using a Complementary Metal Oxide Semiconductor (CMOS) image sensor, which is not the CCD image sensor.

An image processor (not shown) processes digitalized raw data to be displayable by control of the controller 130. The image processor (not shown) removes black level occurring by dark current generated by the CCD image sensor which is sensitive to temperature change and the CFA filter. The image processor (not shown) performs gamma correction to encode information to be suitable for nonlinearity of the human sight. The image processor (not shown) performs CFA interpolation to interpolate a bayer pattern which is implemented with an RGRG line and a GBGB line of gamma-corrected data into an RGB line. The image processor (not shown) converts the interpolated RGB signal into a YUV signal, performs edge compensation to process an image clearly by filtering the Y signal using a high band filter, performs color correction by correcting color values of the U and V signals using a standard color coordinate system, and removes noise. The image processor (not shown) generates a JPEG file by compressing and processing the noise-removed Y, U, and V signals, and stores the generated JPEG file in the storage 170. The image processor (not shown) processes an image as described above, but this is merely an embodiment. The image processor (not shown) may process an image in other methods.

The photographing unit 116 may include a camera. According to various embodiments, the photographing unit 116 may include more cameras. The camera may be provided on a housing of the user terminal 100, or may be connected to the user terminal 100 using a separate connection. The camera may include a supplementary light source (e.g. a flash (not shown)) to provide an amount of light needed to take a picture.

The touch sensor 111 senses the user's touch on the display 190 of the user terminal 100. That is, the touch sensor 111 is a sensor that senses input of selecting an object displayed on the display screen by contacting the display 190 using the user's body such as a finger or a sensible input device. Methods of sensing the user's touch using the touch sensor 111 are divided into a capacitive method and a piezoelectric method. The touch sensor 111 according to an embodiment of the present disclosure may be implemented in any of the two methods. The touch sensor 111 may constitute the display 190 together with a display panel.

When the user contacts the touch screen, the touch sensor 111 senses the contact and processes the contact into a signal, and provides the signal to the controller 130. The controller 130 performs a command corresponding to the signal. For example, when the user inputs touch corresponding to a control command to record a sound. The touch sensor 111 recognizes the touch and provides a signal to the controller 130, and the controller 130 controls the sound detector 162 to collect a sound.

The geomagnetic sensor 112 senses azimuth by detecting the flow of terrestrial magnetism. The geomagnetic sensor 112 detects bearing coordinates of the user terminal 100, and detects the direction in which the user terminal 100 is placed based on the coordinates. The direction is recognized as corresponding control input so that the controller 130 may perform corresponding output.

The acceleration sensor 113 senses acceleration of the user terminal 100. The acceleration sensor 113 sets virtual x, y, and z axes on the user terminal 100 and detects acceleration of gravity changing according to a slope of each axis. The acceleration sensor 113 is used to detect acceleration (dynamic acceleration) of a moving object, but is generally used to detect acceleration of gravity.

Although not shown in FIG. 11, the sensor 110 of the user terminal 100 may further include at least one of a gravity sensor which senses which direction gravity acts, a gyro sensor which recognizes a total of 6 axes by adding rotation to an existing acceleration sensor, an orientation sensor which can automatically rotate and arrange content by automatically sensing horizontal and vertical frames of the content such as an image, an illumination sensor which detects intensity of light around the user terminal 100, an altitude measuring sensor which measures atmospheric pressure, an RGB sensor which senses color of an object, a distance measuring sensor which measures distance using ultrasonic waves or infrared light, and a hall sensor which uses change in the voltage according to strength of magnetic field.

Each sensor of the sensor 110 may detect the state, generates a signal corresponding to the detection, and transmit the signal to the controller 130. Each sensor of the sensor 110 may be added or deleted according to performance or purpose of the user terminal 100.

The input/output unit 160 performs input and output using the screen or an external connection port. More specifically, the input/output unit 160 receives an input signal transmitted from an input device such as a mouse, a keyboard, and a joystick which are connected to the user terminal 100, or from a wireless input device such as a remote control and transmits the input signal to the controller 130. In addition, the input/output unit 160 outputs diverse types of signals and data generated by the controller 130 to an external apparatus. The input/output unit 160 may include a button 161, a sound detector 162, a speaker 163, and a vibration motor 164.

At least one button 161 may be provided on a front, side, or back of the housing of the user terminal 100 in a push type or a touch type, and may include at least one of a power/lock button, a volume control button, a menu button, a home button, a back button, and a search button. When the button 161 is pushed, a corresponding control command is generated and is transmitted to the controller 130. The controller 130 controls the operation of the user terminal 100 according to the control command.

As in the touch sensor 111, control input using the button 161 is possible. In the aforementioned example, when the user manipulates the button 161 to correspond to a control command to record a sound around the user terminal 100, the generated signal is provided to the controller 130 and the controller 130 controls the sound detector 162 to collect a sound around the user terminal 100.

The sound detector 162 receives a voice or a sound according to control of the controller 130 and generates an electrical signal. Since the sound detector 162 has been described above, detailed description is not repeated.

The speaker 163 may output sounds corresponding to diverse signals (e.g. wireless signals, broadcast signals, digital audio files, digital video files, or photographing) of the cellular communication module 141, the WLAN module 142, the local communication module 143, the multimedia unit 150, or the photographing unit 116 to the outside of the user terminal 100 according to control of the controller 130.

The speaker 163 may output sounds (e.g. button manipulation sounds or ring back tone corresponding to calling) corresponding to functions of the user terminal 100. One or more speakers 163 may be provided on appropriate locations of the housing of the user terminal 100. For example, the speaker 163 may include an internal speaker module which is provided on a location suitable for approaching the user's ears on the phone, and an external speaker module which has a large output suitable for reproducing audio and video files or showing a broadcast and which is provided on an appropriate location of the housing of the user terminal 100.

The vibration motor 164 converts an electrical signal into a mechanical vibration according to control of the controller 130. For example, when the user terminal 100 in vibration mode receives a call from another device (not shown), the vibration motor 164 operates. One or more vibration motors 164 may be provided in the housing of the multi-display apparatus 100. The vibration motor 164 may operate in response to the user's touch gesture detected on the display 190 or continuous movement of touch which is detected on the display 190.

The storage 170 stores data.

The storage 170 stores an Operating System (OS) program to control operation of the user terminal 100. When the user terminal 100 is turned on, the stored OS is read from the storage, is compiled, and operates each component.

The storage 170 also stores an application program which is managed by the OS, performs operation of the user terminal 100 using resources of the OS, and provides a user interface. The application program is read out of the storage 170 by the OS according to the user's execution command, is changed into an executable state, and performs diverse operations.

Further, the storage 170 stores diverse types of multimedia data processed by the controller 130, content data, and data received from an external source. More specifically, the storage 170 may store an input or output signal, information, or data corresponding to operation of the cellular communication module 141, the WLAN module 142, the local communication module 143, the connector 144, the GPS module 121, the multimedia unit 150, the photographing unit 162, the sensor 110, the input/output unit 160, and the display 190 according to control of the controller.

The storage 170 may be implemented with at least one of a Read-Only Memory (ROM), a Random-Access Memory (RAM), and a memory card (for example, a Secure Digital (SD) card and a memory stick) which is attachable to or detachable from the user terminal 100, a non-volatile memory, a volatile memory, a Hard Disk Drive (HDD), and a Solid State Drive (SSD).

The power supplier 180 supplies power to the user terminal 100. The power supplier 180 may be implemented with a rechargeable battery, and may further include a voltage converter which converts externally supplied power and supplies the converted power to the rechargeable battery.

According to power management control of the controller 130, the power supplier 180 may supply power to the user terminal 100 according to diverse modes, such as maximum performance mode, general mode, power saving mode, and standby mode.

The display 190 outputs an image stored in a frame buffer. The display 190 displays multimedia contents, images, videos, and text according to control of the controller 130.

The display 190 displays diverse applications (for example, a call, data transmission, broadcasting, camera, etc.) executed by the controller 130 and provides a corresponding user interface. The display 190 may include the aforementioned touch sensor 111. In this case, the display 190 may receive input of at least one touch gesture through the user's body (for example, fingers including a thumb) or a sensible input device (for example, a stylus pen).

Such a user interface may include a touch area, a soft key, and a soft menu. The display 190 transmits an electronic signal corresponding to at least one touch gesture which is input through the user interface to the controller 130 through an LCD controller (not shown). In addition, the display 190 may detect continuous movement of the touch and transmit an electronic signal corresponding to continuous or discontinuous movement to the LCD controller. The display 190 may be implemented in a resistive method, a capacitive method, an infrared method, or an acoustic wave method as described above.

The display 190 converts a sensing signal regarding the user's gesture detected by the touch sensor into a digital signal (e.g. X and Y coordinates), and transmits the digital signal to the controller 130. The controller 130 performs a control operation corresponding to the input user's gesture using the received digital signal. For example, the controller 130 may select a soft key displayed on the display 190 or execute an application corresponding to the soft key in response to the user's gesture.

The user's gesture is not limited to direct contact between the display 190 and the user's body or the touchable input device, but includes non-contact methods. Sensitivity of the user's gesture which can be detected by the display 190 may vary according to performance or structure of the user terminal 100.

Figure 12:
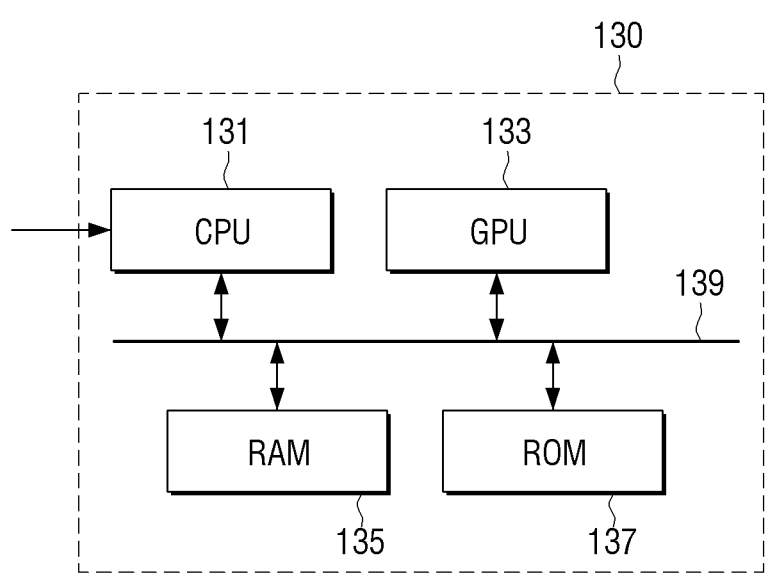
FIG. 12 is a block diagram of a hardware configuration of a controller according to an embodiment of the present disclosure.

With reference to FIG. 12, a hardware configuration of the controller 130 is described below in greater detail.

A Hardware Configuration of the Controller

The controller 130 of the user terminal 100 may include a CPU 131, a GPU 133, a RAM 135, a ROM 137, and a system bus 139 in terms of hardware, and include an OS to drive the hardware, and an application to provide a user interface on the OS and transmit the OS to the framework in terms of software. The OS, framework, and application will be described separately.

FIG. 12 is a block diagram of a hardware configuration of the controller 130 according to an embodiment of the present disclosure.

With reference to FIG. 12, the CPU 131 controls the functions of the components while performing data communication with the components through the system bus 139, collects control results, and controls diverse peripheral devices by transmitting control signals to the diverse peripheral devices which is connected to the controller 130 based on the control results. In addition, the CPU 131 reads out instructions for each process and data from the RAM, and controls an operator to perform operation.

First of all, the CPU 131 boots up the system using booting information pre-stored in the ROM 137. When the system is turned on, the CPU 131 reads out a command to operate each hardware component from the ROM 137, and transmits a control signal to each hardware component according to the command. In addition, the CPU 131 reads out data stored in storage (not shown) into the RAM 135, and transmits to the GPU 133 data which needs graphical processing from among the data stored in the RAM 135. The CPU 131 receives the data which have been graphically processed by the GPU 133, transmits the data to an LCD controller (not shown) which is connected to the system bus 139, and displays an image on the display.

The CPU 131 temporarily stores the image data processed by the GPU 133 in a virtual frame buffer area which is allocated in an area of the RAM 135. The CPU 131 allocates the virtual frame buffer area in order to support the maximum resolution (for example, 1024×600) of the display.

The CPU 131 performs digital signal processing by inputting the data which is temporarily stored in the virtual frame buffer to the GPU 133.

The GPU 133 performs graphical processing of the input data according to control of the CPU 131. More specifically, the GPU 133 generates a screen including diverse objects, such as an icon, an image, and text, using an operator (not shown) and a renderer (not shown). The operator operates property values of each object, such as a coordinate value, shape, size and color, according to layout of the screen. The renderer generates the screen having diverse layouts including the objects based on the property values operated by the operator. The screen generated by the renderer is transmitted to the display 190 through the bus 139, and is displayed on a display area or is stored in the storage 170.

The CPU 131 may display the data which are graphically processed by the GPU 133 on the display 190, store the data in the storage 170, or input the data to a display controller (not shown).

The GPU 133 may include a decoder, a renderer, and a scaler. Accordingly, the GPU 133 decodes stored content, constitutes a frame by rendering the decoded content data, and scales the size of the frame to be suitable for the size of the display according to control of the display controller (not shown). The GPU 133 transmits the processed frame to the display so that the display can show the content.

The controller 130 may further include an audio processor and an interface. The interface is a component to interface with peripheral components.

The audio processor (not shown) interfaces with the multimedia unit 120 through an audio interface (not shown), processes audio data, and transmits the audio data to an audio output such as a speaker. The audio processor performs audio signal processing such as decoding audio data stored in the storage 170 or audio data received through the communicator 110, filtering noise, and amplifying the audio data to an optimal decibel. In the above example, when the content is video, the audio processor processes audio data de-multiplexed from the video and transmits the audio data to the speaker so that the audio data can be synchronized with output from the GPU 133.

The ROM 137 stores a set of commands for booting up the system. When a turn-on command is input and the power is supplied, the CPU 131 copies an Operating System (OS) stored in the storage 170 to the RAM 133 and executes the OS according to the commands stored in the ROM 137 so that the system can boot up. When the boot-up is complete, the CPU 131 copies diverse application programs stored in the storage 170 to the RAM 133, and executes copied application programs so that diverse operations can be performed. As mentioned above, the CPU 131 can perform diverse operations according to execution of the application programs stored in the storage 170.

When the user terminal 100 senses the user's touch or other manipulations as described above, the controller 130 may determine whether or not the user's manipulation is intentional. When the controller 130 determines that the user's manipulation is intentional, the controllers reads out information regarding operation corresponding to the user's manipulation from the storage 170 and performs the corresponding operation. This operation of the controller 130 may be realized by running diverse programs stored in the storage 170.

The CPU may be implemented with at least one of a single core processor, a multi-core processor, a triple core processor, and a quad core processor. In the case of the multi-core processor, each processor which composes the multi-core processor performs many processes independently.

A Software Configuration of the Controller

A hierarchy diagram of software which composes the controller 130 is described.

Figure 13:
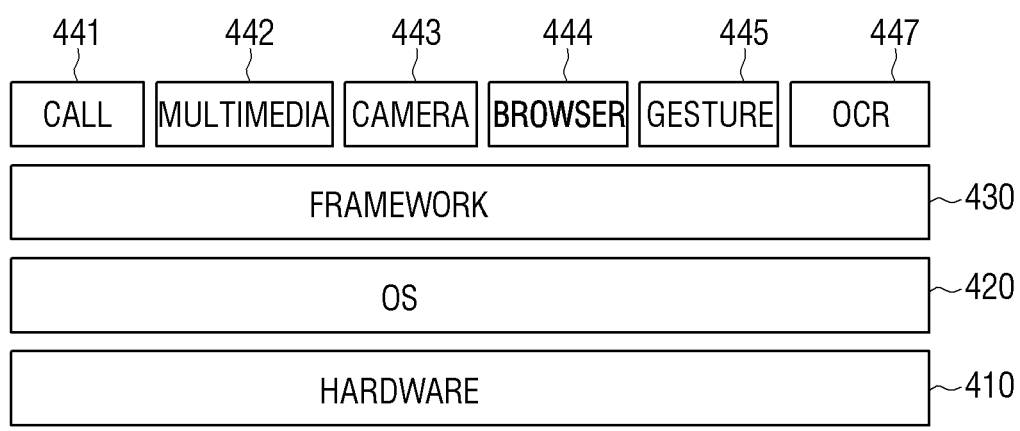
FIG. 13 illustrates a hierarchical system structure of a user terminal according to an embodiment of the present disclosure.

FIG. 13 illustrates a hierarchical system structure of the user terminal 100 according to an embodiment of the present disclosure With reference to FIG. 13, the user terminal 100 may include hardware 410, an OS 420 which drives the hardware 410, an application layer 441 to 445 which are managed as a process by the OS and provides user services using resources, and a framework layer 430 which connects the OS with the application.

The Operating System (OS) 420 controls the overall operation of the hardware 410, and manages a process corresponding to the hardware 410 and each application. That is, the OS 420 is a layer to perform basic functions such as hardware management, memory, and security. The OS 420 may include modules such as a display driver to drive the display 190, a communication driver to transmit and receive data, a camera driver to drive a photographing unit, an audio driver to drive audio unit, and power supply manager. In addition, the OS 420 may further include an API library and a runtime which are accessible by a developer. The OS 420 processes a call of an application and operates hardware according to the processing results.

A framework layer 430 is at an upper level than the OS 420. The framework 430 connects an application layer 440 and the OS layer 420. That is, the framework layer 430 may include a location manager, a notification manager, and a frame buffer which displays an image on the touch screen.

The application layer 440 realizes diverse functions of the multi-display apparatus 100, above the framework layer 430. For example, the application layer 440 may include diverse application programs such as a call application 441, a multimedia application 442, a camera application 443, a browser application 444, a gesture application 445 and an OCR application 447.

The applications 441 to 445 provide a user interface, receive a command from the user, and transmit the command to the OS 420 through the framework or request resources of the OS 420. The OS 420 processes a system call, and manages operation of the multiple applications. According to the processing results of the system call, the OS 420 operates the hardware components including the display 190.

A data transceiving method which will be explained may be implemented with a program including an algorithm which is executable by a computer, and the program may be stored in the storage 170 of the user terminal 100 in an application form. In this case, the OS executes the data transceiving method by operating the application according to the user command, operates hardware, and transceives data. The data transceiving method will be described later.

A Hardware Configuration of the Display

A hardware configuration of the display is described below.

Figure 14:
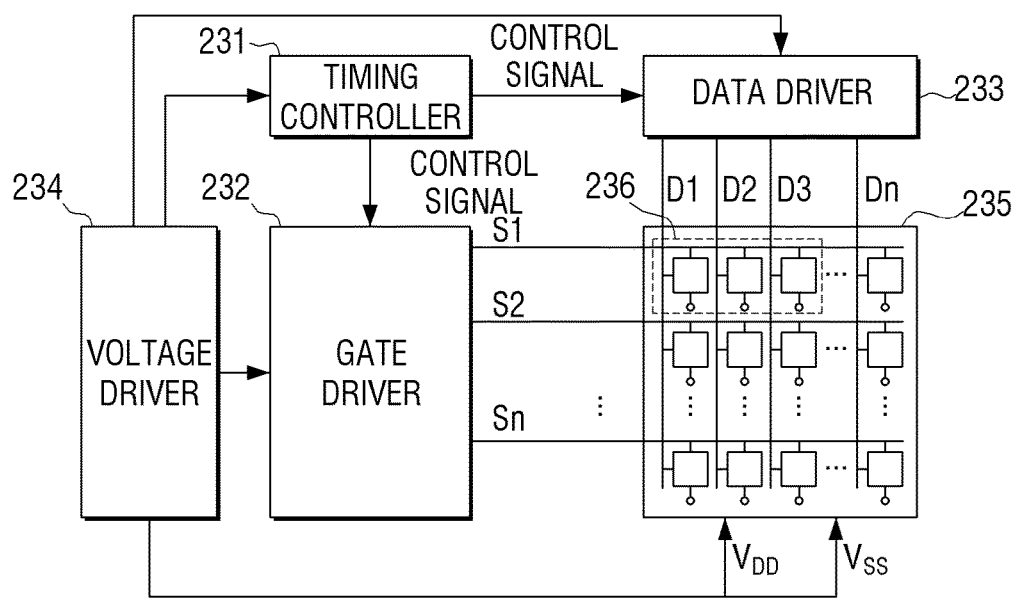
FIG. 14 illustrates a circuit configuration of an image outputter of a display according to an embodiment of the present disclosure.

FIG. 14 illustrates a circuit configuration of an image outputter of a display according to an embodiment of the present disclosure.

With reference to FIG. 14, an image output circuit of the display 190 may include a timing controller 231, a gate driver 232, a data driver 233, a voltage driver 234, and a display panel 235.

The timing controller 231 receives a clock signal (DCLK), a Horizontal sync signal (Hsync), and a Vertical sync signal (Vsync) which are suitable for resolution of the touch screen from the outside, generates a gate control signal (a scanning control signal) and a data control signal (a data signal), rearranges RGB data, and provides the data to the data driver 233.

With regard to the gate control signal, the timing controller 231 may generate a Gate Shift Clock (GSC), a Gate Output Enable (GOE), and a Gate Start Pulse (GSP). The GSC is a signal to determine the time when a Thin Film Transistor (TFT) which is connected to a light emitting element such as RGB Organic Light Emitting Diodes (OLEDs) is turned on or off. The GOE is a signal to control output of the gate driver 232. The GSP is a signal to teach a first driving line of the screen in a single vertical sync signal.

In addition, with regard to the data control signal, the timing controller 231 may generate a Source Sampling Clock (SSC), a Source Output Enable (SOE), and a Source Start Pulse (SSP). The SSC is used as a sampling clock to latch data in the data driver 233, and determines a driving frequency of a data driver Integrated Circuit (IC). The SOE transmits the data latched by the SSC to the display panel 235. The SSP is a signal to teach latch of data or start of sampling during a single horizontal sync period.

The gate driver 232 generates a scanning signal, and is connected to the display panel 235 through scanning lines S1, S2, S3, . . . , and Sn. The gate driver 232 transmits gate on/off voltage (Vgh/Vgl) received from the voltage driving unit 234 to the display panel 235 according to a gate control signal generated by the timing controller 231. The gate on Voltage (Vgh) is provided sequentially from Gate Line 1 (GL1) to Gate Line N (GLn) for realization of a unit frame image.

The data driver 233 generates a data signal, and is connected to the display panel 235 through data lines D1, D2, D3, . . . , and Dm. The data driver 233 completes scaling and inputs RGB data of an image frame to the display panel 235 according to a data control signal generated by the timing controller 231. The data driver 233 converts serial RGB image data provided by the timing controller 231 into parallel data, and converts digital data into analog voltage, and provides image data for a single horizontal line to the display panel 235. This process is performed according to each horizontal line in sequence.

The voltage driver 234 may generate each driving voltage and supplies the generated voltages to the gate driver 232, the data driver 233, and the display panel 235. That is, the voltage driver 234 may receive prevailing voltage, i.e. alternating current voltage of 110V or 220V, from the outside, generate power voltage (VDD) which is needed for the display panel 235, and provide the power voltage, or provide grounding voltage. In addition, the voltage driver 234 may generate gate on voltage (Vgh) and provide the gate on voltage to the gate driver 232. To do so, the voltage driver 234 may include a plurality of voltage driving modules (not shown) which operate individually. The plurality of voltage driving modules (not shown) may provide different voltages according to control of the controller 130, and the controller 130 may control the voltage driver 234 in order that the plurality of voltage driving modules may provide different driving voltages according to predetermined information. For example, each of the voltage driving modules may provide first voltage and second voltage (set as the default) which are different based on predetermined information according to control of the controller 130.

According to an embodiment, the voltage driver 234 may include a plurality of voltage driving modules corresponding to each area of the display panel 235 which is divided into a plurality of areas. In this case, the controller 130 may control the plurality of voltage driving modules to provide different first voltages, i.e. different ELVDD voltages, according to screen information (or input image information) of the plurality of areas. That is, the intensity of the ELVDD voltage may be controlled using an image signal which is input to the data driver 233. The screen information may be at least one of luminance and gray scale information of an input image.

The display panel 235 may include a plurality of gate lines (GL1 to GLn) and a plurality of data lines (DL1 to DLn) which cross over each other and define a pixel area, and RGB light emitting elements, such as OLED, which are provided on the pixel area 236. More precisely, a switching element, that is, a Thin Film Transistor (TFT) is provided at the edge. When the TFT is turned on, gray scale voltage is supplied from the data driver 233 to each of the RGB light emitting elements. At this time, the RGB light emitting elements emit light corresponding to the amount of current provided based on the gray scale voltage. That is, the more amount of current is provided, the brighter light is provided by the RGB light emitting elements.

Figure 15:
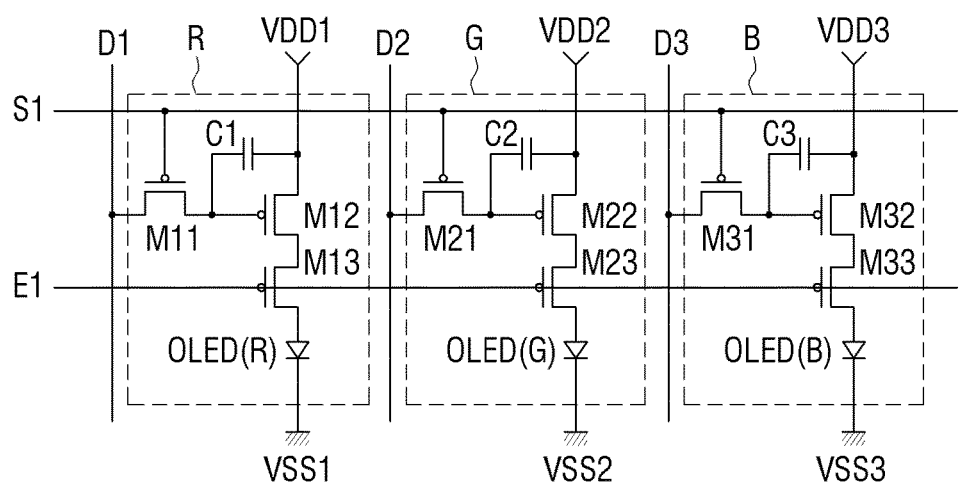
FIG. 15 illustrates a circuit configuration of R, G, and B pixels which compose a display panel shown in FIG. 14 according to an embodiment of the present disclosure.

FIG. 15 illustrates a circuit configuration of R, G, and B pixels which compose a display panel shown in FIG. 14 according to an embodiment of the present disclosure.

With reference to FIG. 15, the display panel 235 includes three R, G, and B pixel areas 236. The R, G, and B pixel areas 236 may include a scan signal S1, switching elements M11, M21, and M31 which operate using gate on Voltage (Vgh), switching elements M12, M22, and M32 which output electrical current based on a pixel value including a changed gray scale value provided to data lines (DL1 to DLn), and switching elements M13, M23, and M33 which adjust an amount of electrical current provided from the switching elements M12, M22, and M32 to R, G, and B light emitting diodes according to a control signal provided by the timing controller 231. The switching elements M13, M23, and M33 are connected to Organic Light Emitting Diodes (OLEDs) to supply electrical current. The OLED is a display that emits light autonomously using a principle of emitting light in an electric field when the electrical current flows to a fluorescent or phosphorescent organic film. An anode electrode of the OLED is connected to a pixel circuit, and a cathode electrode is connected to an ELVSS. The OLED generates light of a luminance corresponding to the electrical current supplied from the pixel circuit. The gate electrode of the switching elements M11, M21, and M31 is connected to scanning line S1, and one of the source electrode and the drain electrode is connected to data line D1. The display panel 235 may be implemented with an Active Matrix Organic Light-Emitting Diode (AM OLED) panel. However, this is merely an embodiment. The present disclosure does not exclude Passive Matrix Organic Light-Emitting Diode (PM OLED).

When the display 190 of the user terminal 100 is implemented with an OLED as described above, a separate light emitting device (a backlight) is not needed. Accordingly, the display device may become slim and lightweight. In addition, a configuration may be simplified.

Although the OLED is described above, the display 190 may also be implemented in diverse display technologies such as a Liquid Crystal Display (LCD) panel, a Plasma Display Panel (PDP), a Vacuum Fluorescent Display (VFD), a Field Emission Display (FED), and an Electro Luminescence Display (ELD). In addition, the display 190 may also be implemented with a flexible display or a transparent display.

Figure 16:
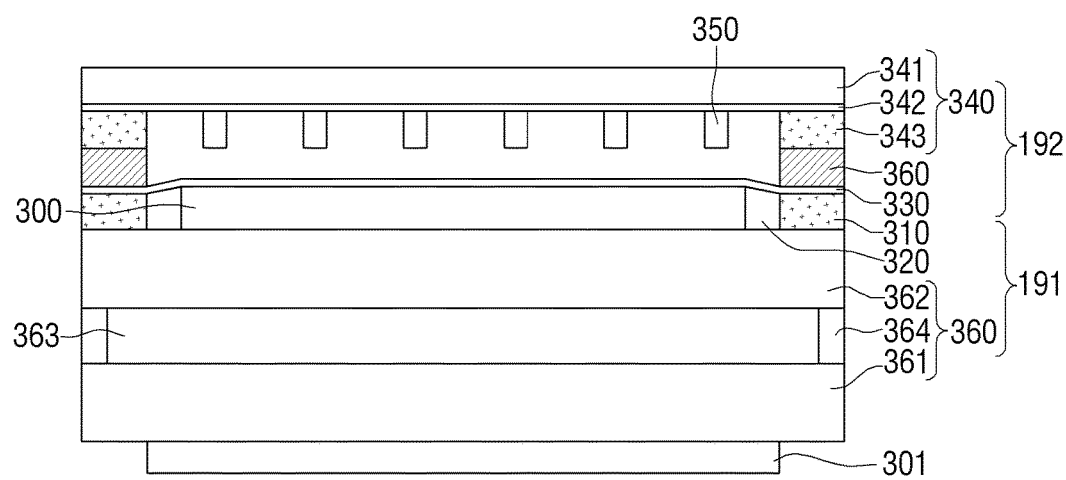
FIG. 16 is a cross-sectional view of a display including a touch screen according to an embodiment of the present disclosure.

FIG. 16 is a cross-sectional view of the display 190 including a touch screen according to an embodiment of the present disclosure.

With reference to FIG. 16, the display 190 may include an image outputter 191 and a touch screen 192.

The image outputter 191 may include a display panel 360 which is formed by sticking an upper substrate 362 and a lower substrate 361 together between a polarizing plate 363, an upper polarizing plate 300 which is provided on the upper substrate 362 of the display panel 360, a lower electrode 310 which is provided on edges of the upper polarizing plate 300 adjacent to a sealing member 320, and a lower polarizing plate 301 which is provided under the lower substrate 361.

A liquid crystal layer may be provided between the upper substrate 362 and the lower substrate 361. The upper substrate 362 and the lower substrate 361 may include a display area which displays an image, and a peripheral area which is provided on the edges of the display area. Although not shown in FIG. 16, the display area of the lower substrate 361 may include a plurality of gate lines, a plurality of data lines, a Thin Film Transistor (TFT) which is provided on an area where the plurality of gate lines and the plurality of data lines cross over each other, a pixel electrode which is connected to the TFT, and a sustaining electrode of which a portion is overlapped with the pixel electrode. The peripheral area of the lower substrate 361 may include a plurality of pads which are connected to the gate lines and the data lines.

The upper substrate 362 and the lower substrate 361 may be sealed with a sealing member 364 such as a sealant and include a polarizing plate 363 between the upper and lower substrates. It is effective that the sealing member 364 is provided on the peripheral areas of the upper substrate 362 and the lower substrate 361.

The touch screen 192 may include a lower transparent electrode 330 which is connected to the lower electrode 310 and is provided on the upper polarizing plate 300, a touch pad 340 which includes an upper transparent electrode 342 and is attached onto the upper substrate 362, and a protrusion 350 which is provided between the upper transparent electrode 342 and the lower transparent electrode 330.

The touch pad 340 may include a base film 341, the upper transparent electrode 342 which is provided under the base film 341, and an upper electrode 343 which is provided under the upper transparent electrode 342.

When the touch pad 340 is externally pressed with strength, the protrusion 350 at a pressed area is in contact with the lower transparent electrode 330 so that the lower transparent electrode 330 and the upper transparent electrode 342 are electrically connected to each other. Due to the electrical connection, the electrical current flowing through the upper transparent electrode 342 and/or the lower transparent electrode 330 changes. A separate sensor (not shown) senses this change and transmits a sensing signal to the controller 130. The controller 130 generates coordinates of the area on which the flow of the electrical current is changed using the sensing signal, and transmits the coordinates to a driver (not shown). The driver may manipulate an image displayed on the display panel 360 corresponding to the received coordinates as if an input tool such as a mouse manipulates the image.

Operation and Configuration of an External Apparatus

Operation and configuration of the external apparatus 200 is described below with reference to FIG. 17.

Figure 17:
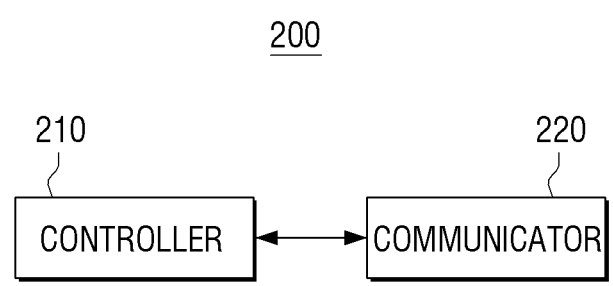
FIG. 17 is a block diagram of a configuration of an external apparatus according to an embodiment of the present disclosure.

FIG. 17 is a block diagram of a configuration of the external apparatus 200 according to an embodiment of the present disclosure.

The external apparatus 200 may include a communicator 220 and a controller 210. As described above, the external apparatus may be at least one of a server, an AP, and a user terminal. The server may include all types of computing systems capable of processing data in a broad range. Accordingly, the external apparatus 200 includes a configuration of a general computing system which is similar to the aforementioned user terminal 100. For example, the external apparatus 200 includes an input/output device, a processor for control/operation, a storage, and a communicator.

The communicator 220 communicates with at least one user terminal. As described above, when the external apparatus 200 is a server, the communicator 220 may be implemented with a short distance communication network or a long distance communication network. In addition, the communicator 220 may include wire and wireless network. In this case, the communicator 220 may be connected to the user terminal 100 through an AP, and may be connected to the AP through a wire communication network. When the external apparatus 200 is another terminal device, direct communication is used. In this case, data may be transceived using the AP. When the external apparatus 200 is an AP, the aforementioned diverse communication device may be used. In particular, when WIFI, WiMAX, 3G, or LTE is used, bulk data may be efficiently transceived.

The controller 210 receives information regarding sound and location detected by at least one user terminal Based on the received information, the controller 210 determines a user group. As described above, the external apparatus 200 determines that user terminals having the same sound and location information during a period of time belong to the same user group. In addition, the external apparatus 200 develops an environment to transceive data relevant to the determined user group with the at least one user terminal, and transceives the data.

In particular, using the WIFI direct method, the above speed may be guaranteed, and direct communication between devices is possible without a separate AP.

In addition, the external apparatus 200 may further include a storage (not shown) which stores diverse types of data. A hardware configuration of the storage is not largely different from that of the user terminal 100. However, in general, the external apparatus 200 has bulk storage. The storage stores and manages data structured as database.

The present disclosure includes the above configurations. Accordingly, since user terminals may be paired using a sound, simple and easy pairing is possible and the possibility of causing errors may be reduced. In addition, data may be transceived securely and conveniently among a plurality of user terminals.

Data Transceiving Methods

Data transceiving methods according to various embodiments of the present disclosure are described below.

Figure 18:
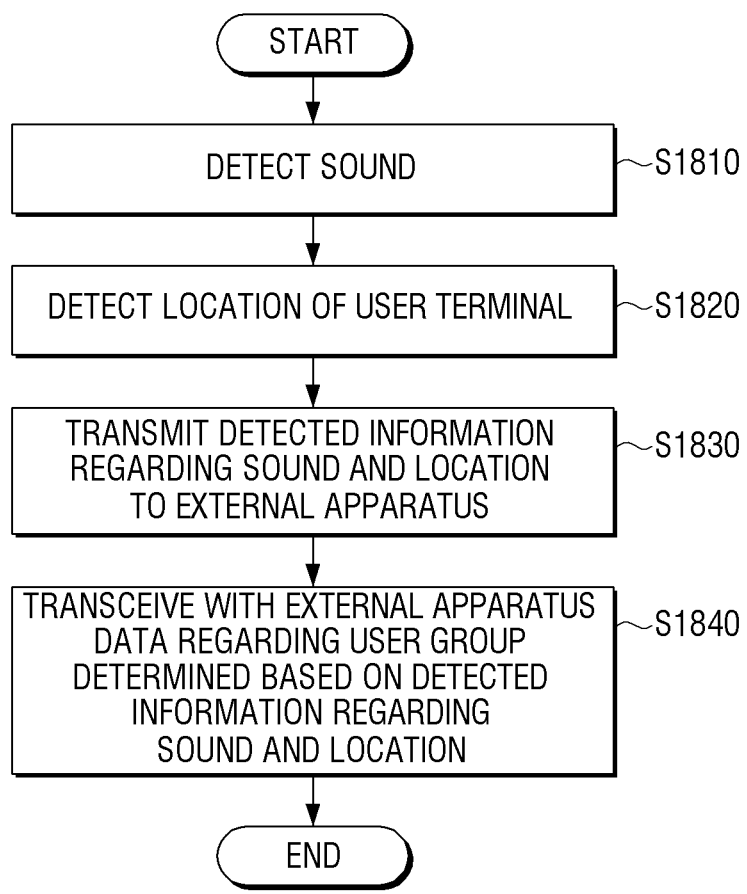
FIGS. 18, 19, 20, 21, and 22 are flow charts illustrating data transceiving methods according to various embodiments of the present disclosure.

FIGS. 18 to 22 are flow charts illustrating data transceiving methods according to various embodiments of the present disclosure With reference to FIG. 18, a data transceiving method according to an embodiment of the present disclosure may include detecting a sound at operation S1810, detecting a location of the user terminal at operation S1820, transmitting the detected information regarding the sound and the location to an external apparatus at operation S1830, and transceiving data at operation S1840.

In the operation of detecting a sound at operation S1810, a sound around a user terminal is detected during a period of time. As in the aforementioned embodiment of the user terminal 100, a microphone may be used.

In the operation of detecting a location at operation S1820, the location of the user terminal is detected during a period of time. As in the aforementioned embodiment, the location may be detected using a location detecting device including a GPS module.

When the sound and the location are detected, the detected information is transmitted to an external apparatus at operation S1830. As in the aforementioned embodiment, diverse short distance communication devices or mobile communication devices may be used.

After the detected information is transmitted, data relevant to a user group determined based on the detected information are transmitted to the external apparatus or received from the external apparatus at operation S1840.

At this time, the external apparatus receives detected information regarding the sound and location from a plurality of user terminals, and determines that from among the plurality of user terminals, user terminals having the same detected sound pattern during the same period of time and at the same location belong to the same user group. Detailed user grouping method has been described above.

In addition, the external apparatus may compare patterns of the sounds detected by the plurality of user terminals in the Least Mean Square (LMS) method and determine the user group.

The external apparatus may be at least one of a server, an AP, and a user terminal.

Figure 19:
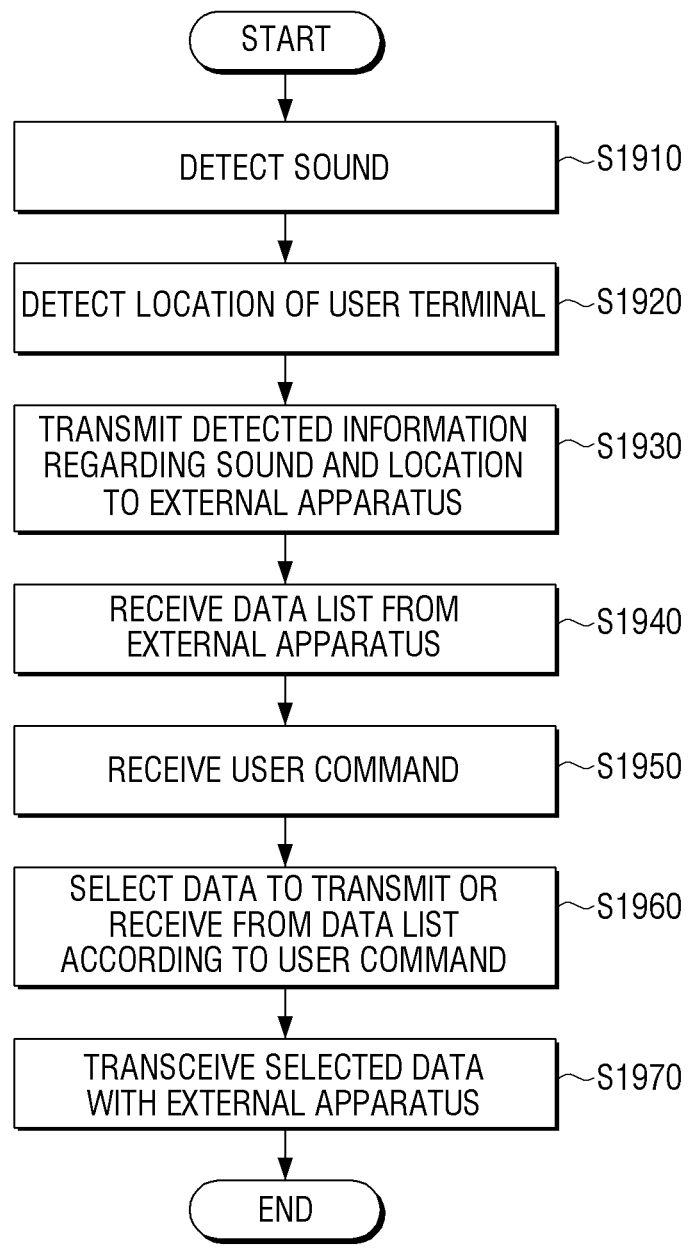

With reference to FIG. 19, a data transceiving method according to an embodiment of the present disclosure may include detecting a sound at operation S1910, detecting a location of the user terminal at operation S1920, transmitting the detected information regarding the sound and the location of the user terminal to an external apparatus at operation S1930, and transceiving data (not shown). Since the operations of S1910, S1920, and S1930 are the same as those of S1810, S1820, and S1830, description thereof is not repeated.

In addition, the operation (not shown) of transmitting or receiving data may include receiving a data list from the external apparatus at operation S1940, receiving a user command at operation S1950, selecting data to transmit or receive according to the user command from the data list at operation S1960, and transceiving the selected data with the external apparatus at operation S1970.

In this data transceiving method, the data may be at least one of contact information, image contents, multimedia contents, URLs, text information, and documents.

In addition, in this data transceiving method, in the operation of transmitting or receiving the data, data relevant to the determined user group may be transmitted or received restrictively according to the security setting state of the user terminal and the external apparatus.

Figure 20:
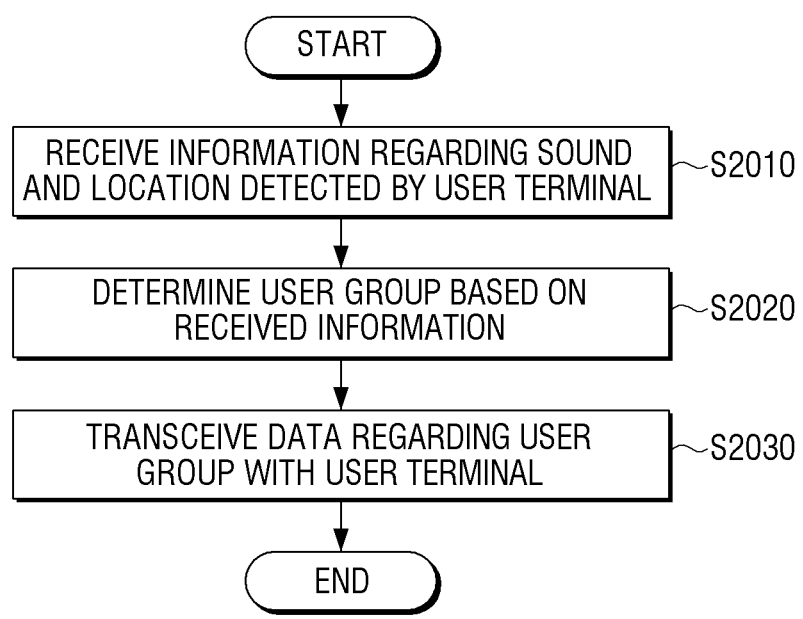

With reference to FIG. 20, a data transceiving method according to an embodiment of the present disclosure may include receiving sound and location information at operation S2010, grouping users at operation S2020, and transceiving data at operation S2030.

Firstly, information regarding a sound and a location which is detected by at least one user terminal is received at operation S2010. Detecting the information regarding the sound and the location is the same as the method described in the aforementioned embodiment of the user terminal 100.

Subsequently, a user group is determined based on the received information at operation S2020. This is also the same as the method described in the aforementioned embodiment.

After the user group is determined, data relevant to the determined user group are transceived with the at least one user terminal at operation S2030.

As described in the aforementioned embodiment, in the operation of determining the user group at operation S2020, user terminals having the same sound pattern in the same period of time and at the same location may be determined as the same sound group from among the plurality of user terminals which transmit the detected information regarding the sound and the location.

What is not described in the data transceiving method operates in the same method as in the aforementioned embodiment regarding the data transceiving system 1000.

Data Transmission and Reception Using Narrator Recognition

A system and a method to detect a sound around the user terminal 100 and the location of the user terminal 100, group user terminals having the same sound pattern in the same period of time, and transceive data in the user group has been described until now. Such a data transceiving system and method enables efficient data transmission and reception among user terminals in a comparatively open space without identifying a particular narrator. In addition, since only sound patterns obtained when an event occurs are compared without separately storing data regarding sound patterns, there is an advantage of reducing the possibility of leakage of personal information in the process of obtaining a sound and comparing sounds.

However, since there is no method for identifying a particular user from the user group, there is a limit of transceiving personal information. For example, when a social security number of a user needs to be transmitted to a user terminal of another user, the social security number needs to be transmitted only by the user, himself. In this case, since the aforementioned system and method cannot identify the user who wants to transmit his social security number, it is insufficient in terms of personal information protection. Accordingly, a method for transceiving data only when a narrator is identified needs to be considered.

According to this necessity, a method for transceiving data by recognizing a narrator is described below.

Figure 21:
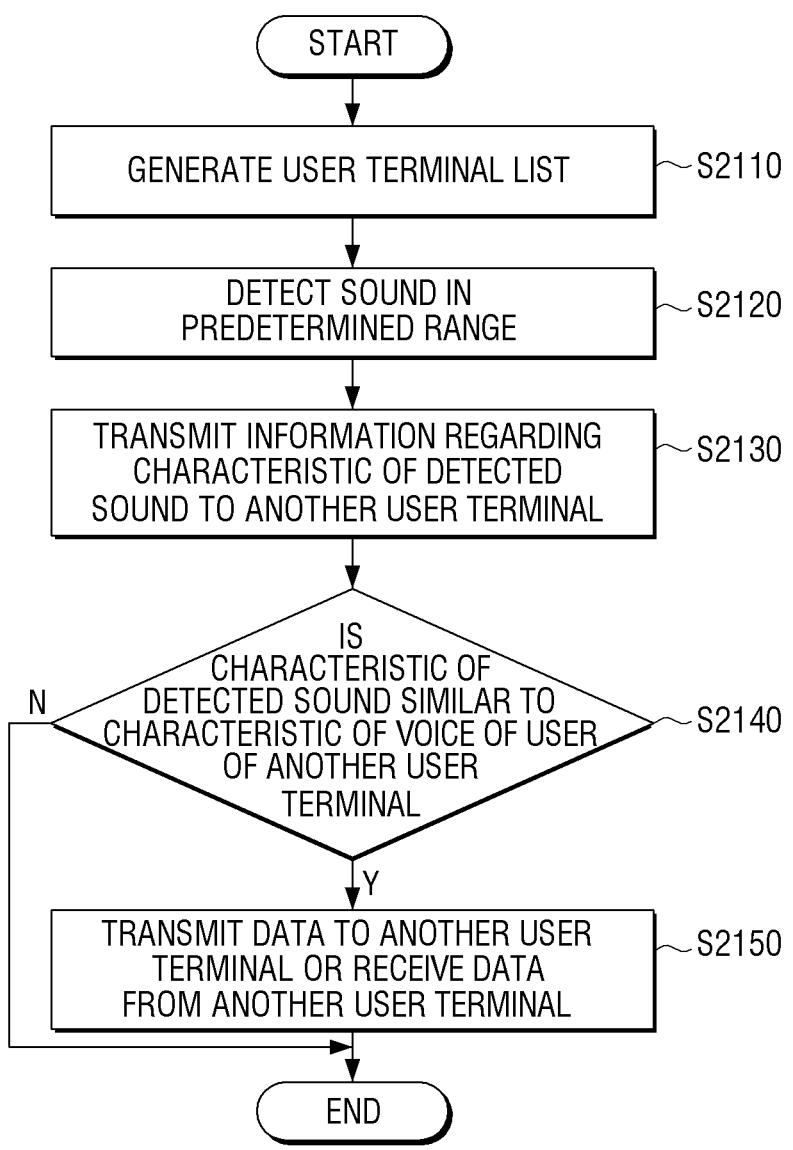
Figure 22:
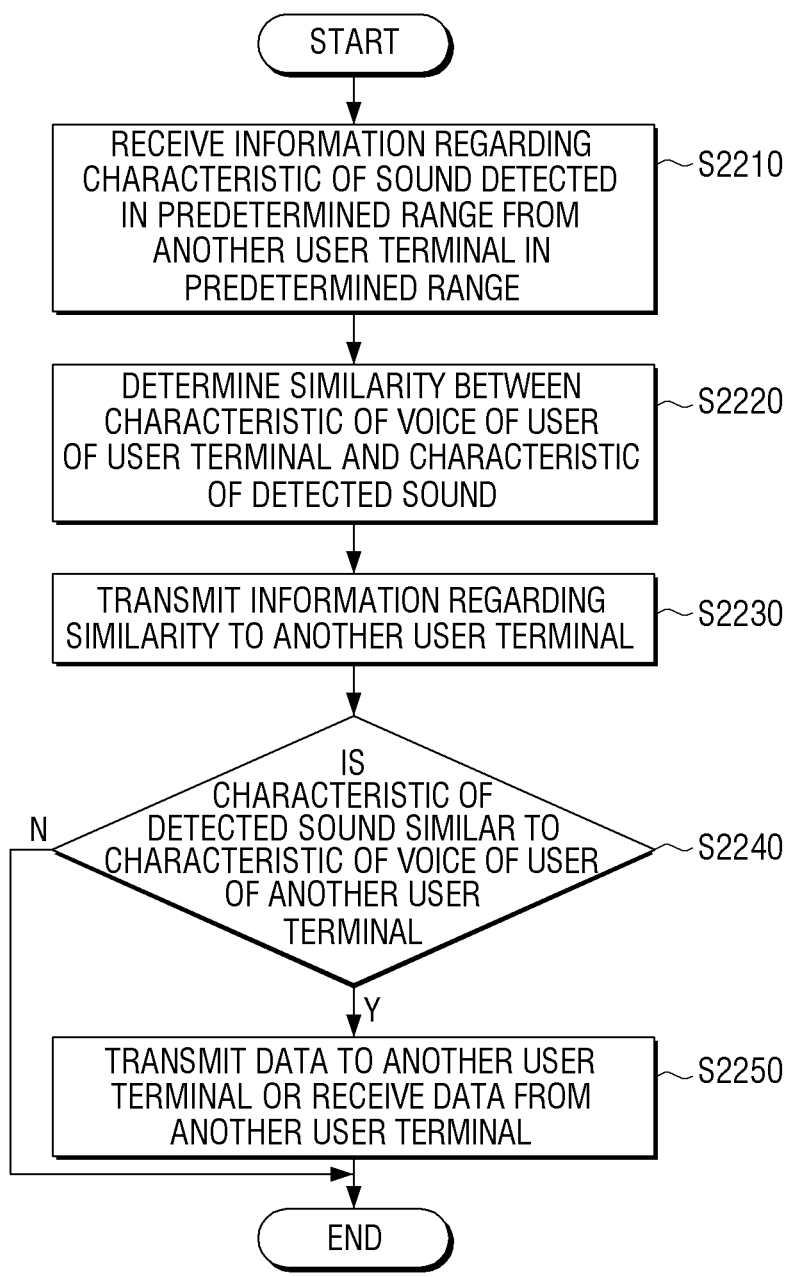

FIGS. 21 and 22 are flow charts illustrating data transceiving methods according to diverse embodiments of the present disclosure.

With reference to FIG. 21, a data transceiving method consistent with an embodiment of the present disclosure may include generating a user terminal list at operation S2110, detecting a sound in a range at operation S2120, transmitting information regarding characteristics of the detected sound to other user terminals at operation S2130, and transceiving data at operation S2150 when a narrator is recognized at operation S2140-Y.

With reference to FIG. 22, a data transceiving method consistent with an embodiment of the present disclosure may include receiving information regarding characteristics of a sound from other user terminals at operation S2210, determining similarity between characteristics of a voice of a user of a user terminal and the received sound characteristics at operation S2220, transmitting information regarding the similarity to other user terminals at operation S2230, and transceiving data at operation S2250 when a narrator is recognized at operation S2240-Y.

Firstly, in the operation of S2110, a user terminal identifies other user terminals present in a range, and generates a user terminal list. The range is a range in which other user terminals are able to be identified in a short distance communication device. Since the short distance communication device has been described above, description thereof is not repeated.

In an embodiment of the present disclosure, a user terminal identifies other user terminals detected by a currently accessed AP, generates a user terminal list based on identifiers of the user terminals registered in the AP, and stores the user terminal list in a storage.

For example, user terminal A receives information regarding user terminals B and C present in a range, and generates a user terminal list. The user terminal list includes identification information of user terminals B and C.

In the operation of S2120, the user terminal detects a sound in a range. As described in the aforementioned embodiment, the user terminal detects a sound by collecting a sound wave around the user terminal and converting the sound wave into an electrical current according to vibration. To do so, the user terminal may include diverse types of microphone. For example, the user terminal may include at least one of a dynamic microphone, a condenser microphone, a piezoelectric microphone which uses a piezoelectric phenomenon, a carbon microphone which uses a contact resistance of a carbon granule, a (non-directional) pressure microphone which generates output in proportion to sound pressure, and a bidirectional microphone which generates output in proportion to sound particle velocity.

In operation S2130, the user terminal transmits information regarding characteristics of the detected sound to other user terminals. The information regarding the characteristics of the detected sound may include at least one of vocal cord frequency characteristics of a narrator determined from the sound, voice tone, and phonemic characteristics when it is determined that the sound is a human voice. The information regarding the characteristics of the detected sound may become a method for identifying the narrator. For example, if characteristics of sounds are similar, the sounds may be determined to be voice of the same narrator. The similarity may be determined according to whether or not a value normalized by analyzing the sound and a value normalized by acquiring and analyzing the voice of the narrator many times are within a margin of error. Other user terminals receive the information regarding the characteristics of the detected sound at operation S2210.

In an embodiment of the present disclosure, if there are user terminals B and C within a range of user terminal A (in other words, if there are user terminals B and C in a user terminal list of user terminal A), user terminal A detects a sound, detects at least one of vocal cord frequency characteristics of a narrator, voice tone, and phonemic characteristics when it is determined that the sound is a human voice, and converts the detected value into a normalized value. Subsequently, user terminal A transmits the normalized value to user terminals B and C. In this case, there are user terminals A and C in the range of user terminal B, and there are user terminals A and B in the range of user terminal C. Accordingly, user terminal B detects the same sound and transmits the same sound to user terminals A and C, and user terminal C detects the same sound and transmits the same sound to user terminals A and B. That is, user terminal A receives the sound from user terminals B and C, user terminal B receives the sound from user terminals A and C, and user terminal C receives the sound from user terminals A and B at operation S2210.

Each user terminal which receives the sound determines similarity between characteristics of voice of the user of each user terminal and characteristics of the received sound at operation S2220. That is, each user terminal determines whether the received sound is the voice of the user of the user terminal. Each user terminal stores characteristics of voice of a corresponding user in advance. That is, user terminal A stores characteristics of voice of the user of user terminal A in advance, user terminal B stores characteristics of voice of the user of user terminal B in advance, and user terminal C stores characteristics of voice of the user of user terminal C in advance.

The characteristics of voice are stored as a value which is averaged and normalized by analyzing voice acquired when the user makes a call or voice search many times. A voice characteristic value may be represented as a value normalized by detecting at least one of vocal cord frequency characteristics of the narrator, voice tone, and phonemic characteristics. The more data are stored, the more precise narrator recognition is possible.

Each user terminal which receives the sound transmits information regarding the similarity between the characteristics of the voice of the user of each user terminal and the characteristics of the received sound to the user terminal which transmitted the sound at operation S2230. In the above embodiment, user terminal A determines whether the sound received from user terminal B is voice of the user of user terminal A, and transmits information regarding the similarity to user terminal B. Similarly, user terminal A determines whether the sound received from user terminal C is voice of the user of user terminal A, and transmits information regarding the similarity to user terminal C.

If the received sound is voice of the user of the user terminal, it indicates that the user of the user terminal made his voice, and the user terminal which transmitted the sound recorded and transmitted the sound. Accordingly, it is determined that the two devices are authenticated. Consequently, a data transmission channel is set between the two devices so that data may be transceived at operations S2150 and S2250.

In the above embodiment, if the sound which user terminal A receives from the user terminal B is not the voice of the user of user terminal A, a data transmission channel is not open between user terminal A and user terminal B. However, if the sound which user terminal A receives from the user terminal C is the voice of the user of user terminal A, a data transmission channel is set between user terminal A and user terminal C devices so that data may be transceived.

In this data transceiving method, a narrator who makes a voice is identified, and data transmission and reception is performed only for the narrator. Accordingly, this is appropriate for transmission and reception of personal information in comparison with the aforementioned embodiment. In addition, there is an advantage of setting a data transmission and reception channel conveniently using a sound as in the aforementioned embodiment. This data transceiving method and system may be applied to diverse areas.

Figure 23:
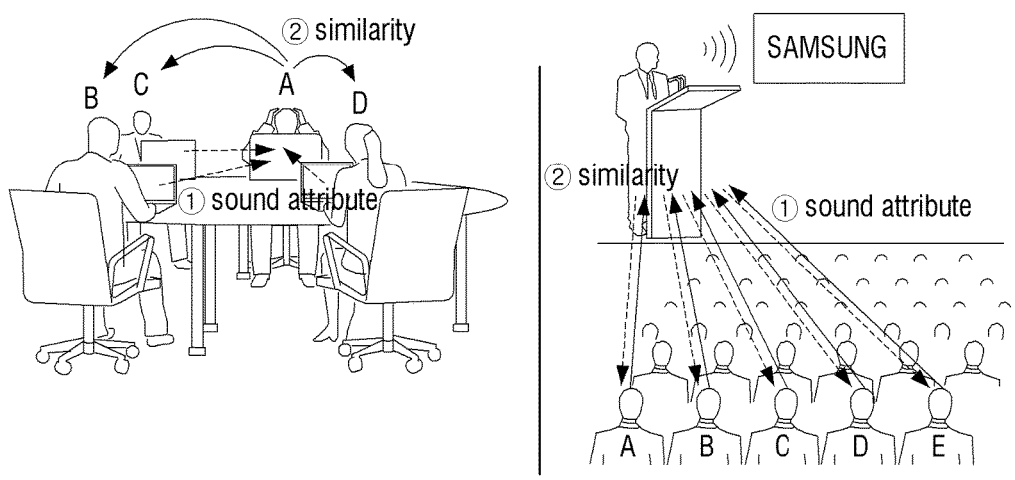
FIGS. 23 and 24 are mimetic diagrams illustrating the various embodiments shown in FIGS. 21 and 22 according to an embodiment of the present disclosure.
Figure 24:
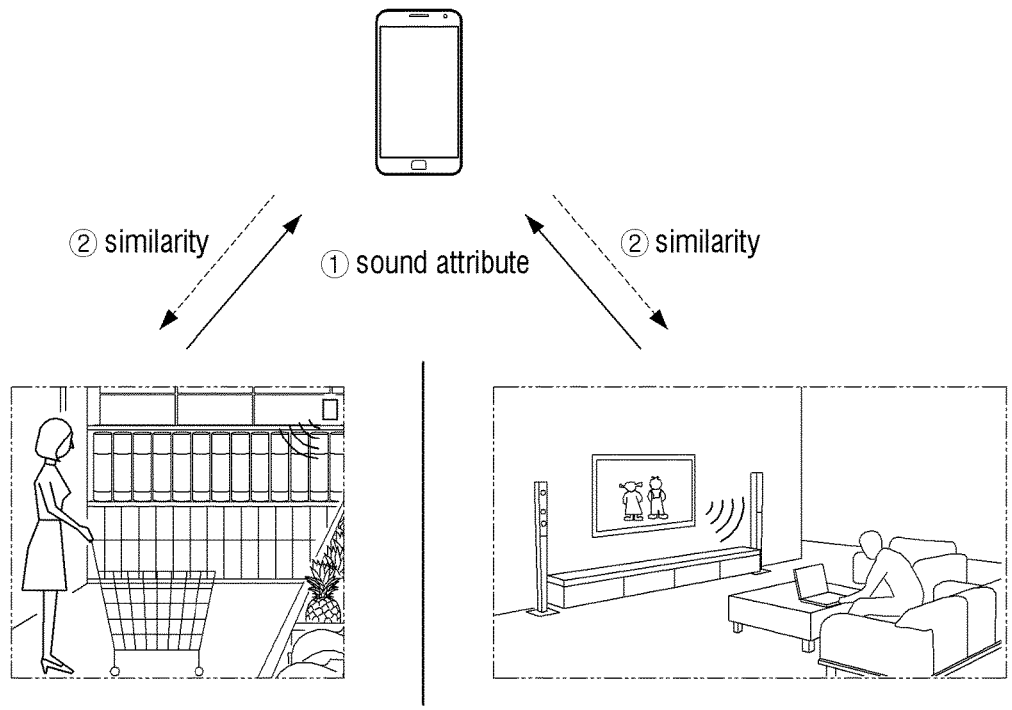

FIG. 23 is a mimetic diagram showing data transmission and reception using narrator recognition in a meeting or lecture according to an embodiment of the present disclosure. FIG. 24 is a mimetic diagram showing data transmission and reception using narrator recognition when shopping or watching Television (TV) according to an embodiment of the present disclosure.

As shown in FIG. 23, the data transceiving method may be used in a meeting which needs narrator recognition. When user A wants to transmit his personal information or transmit data only to meeting attendees, user A makes a voice in order for other users to acquire his voice. Each user transmits the acquired voice of user A to other user terminals in the meeting room. Since a user terminal which stores characteristics of the voice of user A is only the user terminal of user A, a data transmission and reception channel is set only between the user terminal of user A and other user terminals. Accordingly, user A can transmit personal data only to the meeting attendees securely.

The present general inventive concept may be applied to a lecture. The lecturer opens an ID and a password of an account to access lecture materials. Audience A, B, C, D, and E acquires voice of the lecturer, transmits the acquired voice to a user terminal of the lecturer, and thereby acquires the ID and the password.

In an embodiment as shown in FIG. 24, the present general inventive concept may be applied to shopping and TV watching. The user may collect a sound from a speaker of a market, transmit the sound to a server or another user terminal, perform authentication, and acquire necessary product information or contract information. Also, a TV viewer may collect a sound from TV, transmit the sound to a server or another user terminal, perform authentication, and receive services.

In the data transceiving method, an N number of people do not need to perform input N−1 times, but transceive data with a single command simply and efficiently. In addition, since a narrator can be recognized, personal information can be securely transceived between devices.

A Recording Medium which Records the Data Transceiving Method

The aforementioned data transceiving methods may be implemented with programs including an algorithm which is executable by a computer, and the programs may be stored in a non-transitory computer readable medium and be provided.

The non-transitory computer readable medium is a medium which does not store data temporarily such as a register, cash, and memory but stores data semi-permanently and is readable by devices. More specifically, the aforementioned diverse applications or programs may be stored in a non-transitory computer readable medium such as a Compact Disk (CD), Digital Video Disk (DVD), hard disk, Blu-ray disk, Universal Serial Bus (USB), memory card, and Read-Only Memory (ROM) and be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user terminal, comprising:
   a communicator configured to communicate with an external apparatus;
   a sound detector configured to detect a sound around the user terminal during a period of time;
   a location detector configured to detect a location of the user terminal during the period of time;
   at least one processor configured to:
      automatically transmit detected sound information and detected location information to the external apparatus, and
      receive data identifying a user group determined based on the detected sound information and the detected location information from the external apparatus,
   wherein the user group comprises a plurality of user terminals which are located within a preset area and have a same sound pattern detected within a same period of time,
   wherein the at least one processor is further configured to receive data related to the user group restrictively according to a result of a comparison of a security level set for the user terminal and a security level set, by an external apparatus, for data related to the determined user group, and
   wherein the external apparatus is configured to determine the user group by comparing patterns of the detected sounds by the plurality of user terminals in a least mean square (LMS) method; and
   an inputter configured to receive a user command,
   wherein the at least one processor is further configured to:
      receive a list of the data from the external apparatus, and
      select data to receive according to the user command from the list of the data.

2. The user terminal as claimed in claim 1, wherein the external apparatus is further configured to:
   receive the detected sound information and the detected location information from a plurality of user terminals, and
   determine that among the plurality of user terminals, user terminals having a same sound pattern in a same period of time and at a same location belong to a same user group.

3. The user terminal as claimed in claim 1, wherein the external apparatus is at least one of a server, an Access Point (AP), or a user terminal.

4. The user terminal as claimed in claim 1, wherein the data comprises at least one of contact information, image contents, multimedia contents, uniform resource locators (URLs), text information, or documents.

5. An external apparatus, comprising:
   a communicator configured to communicate with at least one user terminal; and
   at least one processor configured to:
      receive sound information and location information, detected by the at least one user terminal,
      determine a user group based on the received detected sound information and the detected location information, and
      transceive data identifying the determined user group with the at least one user terminal,
   wherein the user group comprises a plurality of user terminals which are located within a preset area and have a same sound pattern detected within a same period of time,
   wherein the external apparatus is configured to determine the user group by comparing patterns of the detected sounds by the plurality of user terminals in a least mean square (LMS) method, and
   wherein the at least one processor is further configured to:
      transmit data related to the user group restrictively according to a result of a comparison of a security level set for the user terminal and a security level set, by an external apparatus, for data related to the determined user group, and
      transmit a list of data to the user terminal wherein the user terminal is configured to receive a user command and the list of the data and select data to transmit and receive according to the user command from the list of data.

6. The external apparatus as claimed in claim 5, wherein the at least one processor is further configured to determine that from among the at least one user terminal which transmits the detected sound information and the detected location information, user terminals having a same sound pattern in a same period of time and at a same location belong to a same user group.

7. A data transceiving system, comprising:
   a user terminal configured to:
      detect a sound around the user terminal and a location during a period of time,
      automatically transmit detected sound information and detected location information to an external apparatus,
      receive a user command and a list of data from the external apparatus, and
      select data to receive according to a user command from the list of the data; and
   an external apparatus configured to:
      receive the detected sound information and the detected location information,
      determine a user group based on the received detected sound information and the detected location information, and
      transceive data identifying the user group with the user terminal, wherein the user group comprises a plurality of user terminals which are located within a preset area and have a same sound pattern detected within a same period of time, and wherein the external apparatus is further configured to:
determine the user group by comparing patterns of the detected sounds by the plurality of user terminals in a least mean square (LMS) method,
transmit data related to the user group restrictively according to a result of a comparison of a security level set for the user terminal and a security level set, by an external apparatus, for data related to the determined user group, and
transmit a list of data to the user terminal wherein the user terminal is configured to receive a user command and the list of the data and select data to transmit according to the user command from the list of data.

8. A data transceiving method, comprising:
at a user terminal having at least one processor, a sound detector, a location detector, and a communicator:
controlling the sound detector for detecting a sound around the user terminal during a period of time;
controlling the location detector for detecting a location of the user terminal during the period of time;
controlling the communicator for automatically transmitting detected sound information and detected location information to an external apparatus;
controlling the communicator for further transmitting data identifying a user group determined based on the detected sound information and the detected location information to the external apparatus or receiving the data from the external apparatus; and
controlling the communicator for further receiving data related to the user group restrictively according to a result of a comparison of a security level set for the user terminal and a security level set, by an external apparatus, for data related to the determined user group,
wherein the user terminal is configured to receive a user command and the list of the data and select data to transmit according to the user command from the list of data,
wherein the user group comprises a plurality of user terminals which are located within a preset area and have a same sound pattern detected within a same period of time, and
wherein the external apparatus is configured to determine the user group by comparing patterns of the detected sounds by the plurality of user terminals in a least mean square (LMS) method.

9. The method as claimed in claim 8, wherein the external apparatus is configured to:
receive the detected sound information and the detected location information from a plurality of user terminals, and
determine that among the plurality of user terminals, user terminals having a same sound pattern in a same period of time and at a same location belong to a same user group.

10. The method as claimed in claim 8, wherein the external apparatus is at least one of a server, an access point (AP), or a user terminal.

11. The method as claimed in claim 8, wherein the transmitting or receiving the data comprises:
receiving a list of the data from the external apparatus;
receiving a user command; and
selecting data to transmit or receive according to the user command from the list of the data.

12. A data transceiving method performed by an external apparatus, the method comprising:
receiving sound information and location information, detected by the at least one user terminal;
determining a user group based on the received detected sound information and detected location information;
transceiving data identifying the determined user group with the at least one user terminal, wherein the user group comprises a plurality of user terminals which are located within a preset area and have a same sound pattern detected within a same period of time;
transceiving data related to the user group restrictively according to a result of a comparison of a security level set for the at least one user terminal and a security level set for data related to the determined user group; and
transmitting a list of data to the user terminal,
wherein the user terminal is configured to receive a user command and the list of the data and select data to transmit according to the user command from the list of data, and
wherein the external apparatus is configured to determine the user group by comparing patterns of the detected sounds by the plurality of user terminals in a least mean square (LMS) method.

13. The method as claimed in claim 12, wherein in the determining the user group, determining that from among the at least one user terminal which transmits the detected sound information and the detected location information, user terminals having a same sound pattern in a same period of time and at a same location belong to a same user group.

* * * * *